United States Patent
Kitada et al.

(10) Patent No.: US 7,118,224 B2
(45) Date of Patent: Oct. 10, 2006

(54) MONITOR SYSTEM FOR PROJECTION APPARATUS, PROJECTION APPARATUS, MONITOR PROGRAM FOR PROJECTION APPARATUS, AND MONITOR METHOD FOR PROJECTION APPARATUS

(75) Inventors: Naruhide Kitada, Fujimi-cho (JP); Mikio Aoki, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 102 days.

(21) Appl. No.: 10/697,307

(22) Filed: Oct. 31, 2003

(65) Prior Publication Data

US 2004/0150801 A1    Aug. 5, 2004

(30) Foreign Application Priority Data

Nov. 7, 2002  (JP)  ............................. 2002-323981
Aug. 11, 2003  (JP)  ............................. 2003-291654

(51) Int. Cl.
*G03B 21/26*  (2006.01)
*G03B 21/14*  (2006.01)
*G03B 21/00*  (2006.01)
*H04N 3/22*  (2006.01)

(52) U.S. Cl. ............................. 353/69; 353/30; 353/31; 353/121; 348/745

(58) Field of Classification Search ................ 353/30, 353/69, 70, 121, 122, 31; 348/745, 746, 348/807; 725/143, 151

See application file for complete search history.

(56) References Cited

U.S. PATENT DOCUMENTS

| | | | | |
|---|---|---|---|---|
| 4,954,913 A | * | 9/1990 | Kajita | 358/474 |
| 5,532,764 A | | 7/1996 | Itaki | 348/745 |
| 6,836,298 B1 | * | 12/2004 | Song et al. | 348/745 |
| 2002/0038462 A1 | * | 3/2002 | Sakakibara et al. | 725/151 |
| 2002/0041364 A1 | * | 4/2002 | Ioka | 353/69 |
| 2002/0136469 A1 | * | 9/2002 | Moroo | 382/313 |

FOREIGN PATENT DOCUMENTS

| | | |
|---|---|---|
| JP | A 9-130700 | 5/1997 |
| JP | A 11-112912 | 4/1999 |
| JP | 2000-241874 | 9/2000 |
| JP | A 2003-5126 | 1/2003 |

\* cited by examiner

*Primary Examiner*—Melissa Jan Koval
(74) *Attorney, Agent, or Firm*—Oliff & Berridge, PLC

(57) ABSTRACT

The present invention provides a monitor system for a projection apparatus which system is suitable for detecting errors in a display on a projection screen. A projection apparatus 100 comprises a projection section 120 that projects an image on a screen 110, an image pickup element 130 into which the actual projected image projected by the projection section 120 is loaded, an error detection section 140 that detects errors in the projection section 120 on the basis of the actual projected image loaded into the image pickup element 130, and a notification section 150 that carries out a predetermined notification when the error detection section 140 detects an error. The error detection section 140 detects errors in the projection section 120 on the basis of an original projected image to be projected by the projection section 120 and an actual projected image loaded into the image pickup element 130.

26 Claims, 7 Drawing Sheets

MONITOR SYSTEM FOR PROJECTION APPARATUS, PROJECTION APPARATUS, MONITOR PROGRAM FOR PROJECTION APPARATUS, AND MONITOR METHOD FOR PROJECTION APPARATUS

BACKGROUND OF THE INVENTION

1. Field of the Invention

The present invention relates to a system, apparatus, program, and method for monitoring a projection apparatus such as a projector, and in particular, to a monitor system for a projection apparatus, a projection apparatus, a monitor program for a projection apparatus, and a monitor method for a projection apparatus all of which are suitably used to detect errors in a display on a projection screen.

2. Description of the Related Art

For example, the video display apparatus disclosed in Patent Document 1 has hitherto been used as a technique for monitoring a projection apparatus such as a projector.

This video display apparatus comprises a video display that displays a video, a power source, a light source lighted when provided with power by the power source, to irradiate the video displayed on the video display with light to display the video on a screen, a control section which receives a power source error signal from the power source if any error is occurring in the power source and which receives a light source error signal from the light source if the light source cannot be lighted, and an error display section that indicates whether an error is occurring in the power source or light source, in response to an instruction from the control section.

[Patent Document 1] Japanese Patent Laid-Open No. 11-112912

However, with the conventional video display apparatus, a user is notified of an error through a light source error signal from the light source only if the light source cannot be lighted. It is impossible to detect errors in the light source in which the light source can still be lighted or errors in the video display such as a point or line defect. That is, errors in a display on a projection screen cannot be sufficiently detected.

Thus, the present invention is provided in view of these unsolved problems of the prior art. It is thus an object of the present invention to provide a monitor system for a projection apparatus, a projection apparatus, a monitor program for a projection apparatus, and a monitor method for a projection apparatus all of which are suitably used to detect errors in a display on a projection screen.

SUMMARY OF THE INVENTION

[First Aspect]

To accomplish the above object, a first aspect of the present invention provides a monitor system that monitors a projection apparatus having projection section for projecting an image, the system being characterized in that an actual projected image projected by the projection section is loaded into the projection section so that errors in the projection section can be detected on the basis of the loaded actual projected image.

With this arrangement, in the projection apparatus, the projection section projects an image. Then, the actual projected image projected by the projection section is loaded. An error in the projection section is detected on the basis of the loaded actual projected image.

Thus, errors in the projection section are detected on the basis of the actual projected image. Accordingly, compared to the prior art, errors in a display on the projection screen can be detected at a detailed level not only if the light source cannot be lighted but also if, for example, any line defect is occurring in the actual projected image.

Further, since errors in the projection section are detected on the basis of the actual projected image, it is possible to detect errors such as line defects, point defects, the nonuniformity of colors, the nonuniformity of the amount of light, and the degradation of a lamp all associated with a light valve. These errors are difficult to detect using an internal circuit of the projection apparatus.

Here, the projection section is a mechanism for generating and projecting an image and includes a light source, the light valve (for example, a liquid crystal, a DMD, or an LCOS), a lens, and a panel driver. The projection apparatus includes the projection section.

Further, the present system may be implemented as a single apparatus or terminal or another piece of equipment or as a network system in which a plurality of apparatuses or terminals or other pieces of equipment are connected together so as to communicate with one another. In the latter case, the components may each belong to any one of the plural pieces of equipment, provided that they are connected together so as to communicate with one another. This also applies to a monitor system for a projection apparatus according to a second aspect of the present invention.

[Second Aspect]

Furthermore, a second aspect of the present invention provides a monitor system that monitors a projection apparatus having projection section for projecting an image, the system being characterized by comprising image loading section for loading an actual projected image projected by the projection section, error detection section for detecting errors in the projection section on the basis of the actual projected image loaded into the image loading section, and error notification section for carrying out a predetermined notification when the error detection section detects an error, and in that the error detection section detects errors in the projection section on the basis of an original projected image to be projected by the projection section and the actual projected image loaded into the image loading section.

With this arrangement, in the projection apparatus, the projection section projects an image. Then, the actual projected image projected by the projection section is loaded into the image loading section. The error detection section attempts to detect errors in the projection section on the basis of the original projected image to be projected by the projection section and the loaded actual projected image. When an error is detected, the error notification section carries out a predetermined notification.

Thus, errors in the projection section is detected on the basis of the original projected image and the actual projected image. Accordingly, compared to the prior art, errors in the display on the projection screen can be detected at a detailed level not only if the light source cannot be lighted but also if, for example, there is a line defect in the actual projected image. Further, the original projected image is compared with the actual projected image loaded into the image loading section. Consequently, a user can relatively accurately notice an error in the actual projected image. Further, the predetermined notification enables the user to notice an error in the projection section.

Here, the original projected image is an ideal image constructed using a projected image signal or projected image information inputted to the projection section. For example, it may be an ideal image constructed using a projected image signal or projected image information, or a sample image already generated regardless of the projected image signal or projected image information. This also applies to the projection apparatus according to a twentieth and twenty-second aspects, a monitor program for a projection apparatus according to a fortieth and forty-second aspects, and a monitor method for a projection apparatus according to a sixtieth and sixty-second aspects.

Further, the error detection section may be arbitrarily configured, provided that it can carry out the predetermined notification. For example, it may be adapted to carry out the predetermined notification to notify the projection apparatus of an error or notify a monitor center of an error, the monitor center monitoring the projection apparatus.

[Third Aspect]

Furthermore, according to a third aspect of the present invention, the monitor system for a projection apparatus according to the second aspect of the present invention is characterized:

in that the projection section projects an image on a screen on the basis of a projected image signal or the projected image information, and the original projected image is constructed using the projected image signal or the projected image information.

With this arrangement, in the projection apparatus, the projection section projects an image on the screen on the basis of a projected image signal or projected image information. Then, the actual projected image projected by the projection section is loaded into the image loading section. The error detection section attempts to detect errors in the projection section on the basis of the original projected image constructed using the projected image signal or projected image information and on the loaded actual projected image.

Thus, errors in the projection section are detected on the basis of the original projected image constructed using the projected image signal or projected image information and on the actual projected image. Accordingly, errors in the display on the projection screen can be relatively accurately detected.

Further, when the projected image signal is used as the actual projected image, a simple comparison circuit can be used to detect errors by using a signal outputted by the image loading section as it is.

Alternatively, when the projected image information is used as the actual projected image, i.e. a digital image is used as the actual projected image, the images can be compared with each other. Consequently, the cause of an error in the display apparatus can be relatively accurately determined.

Here, the projected image information is composed of colors resulting from color synthesis, i.e. an image that can be directly seen by human beings. Further, the projected image signal is inputted to a light valve, and in this signal, an image is divided into R, G, and B. Furthermore, the projected image signal contains a synchronous signal for drawing.

[Fourth Aspect]

Moreover, according to a fourth aspect of the present invention, the monitor system for a projection apparatus according to the second or third aspect of the present invention is characterized:

in that the monitor center that monitors the projection apparatus and the projection apparatus are connected together so as to communicate with each other, in addition to the projection section, the projection apparatus has the image loading section, the error detection section, and the error notification section, and when the error detection section detects an error, the error notification section carries out predetermined notification to notify the monitor center of the error.

With this arrangement, with the projection apparatus, when the error detection section detects an error, the error notification section carries out predetermined notification to notify the monitor center of the error.

Thus, the monitor center can receive the predetermined notification to notice an error occurring in the projection apparatus.

Further, when an error is detected, notifying a user of its status enables the user to start a maintenance support quickly. Therefore, the quality of services such as billboard vision can be improved.

[Fifth Aspect]

Furthermore, according to a fifth aspect of the present invention, the monitor system for a projection apparatus according to any of the second to fourth aspects of the present invention is characterized:

in that the image loading section is a one-dimensional line sensor.

With this arrangement, the one-dimensional line sensor can obtain a line image from the actual projected image projected by the projection section.

Thus, since the light valve is generally likely to undergo line defects caused by improper connections, an inexpensive sensor can be used to detect errors. Further, the system can be constructed relatively inexpensively.

[Sixth Aspect]

Moreover, according to a sixth aspect of the present invention, the monitor system for a projection apparatus according to the fifth aspect of the present invention is characterized:

in that the one-dimensional line sensor is adapted to obtain a horizontal line image from the actual projected image.

With this arrangement, the one-dimensional line sensor obtains a horizontal line image from the actual projected image projected by the projection section. Normally, line defects occur in both vertical and horizontal directions of the actual projected image. However, except for initial line defects, vertical line defects are more likely to occur. Thus, by loading a horizontal line image, vertical line defects can be detected.

Thus, line defects are relatively likely to occur in the vertical direction. Accordingly, by arranging a sensor so that it can read data in the horizontal direction, an inexpensive line sensor can be used to detect almost all line defects. Further, the system can be constructed relatively inexpensively.

[Seventh Aspect]

Moreover, according to a seventh aspect of the present invention, the monitor system for a projection apparatus according to any of the second to fourth aspects of the present invention is characterized:

in that the image loading section is a two-dimensional area sensor.

With this arrangement, the two-dimensional area sensor is used to obtain an area image from the actual projected image projected by the projection section.

Thus, compared to the use of the one-dimensional line sensor, errors in the display on the projection screen can be detected relatively reliably. Further, this two-dimensional area sensor can detect errors in local areas such as point defects, the nonuniformity of colors, and the nonuniformity of the amount of light.

[Eighth Aspect]

Moreover, according to an eighth aspect of the present invention, the monitor system for a projection apparatus according to any of the second to seventh aspects of the present invention is characterized:

in that the predetermined notification includes error information on an error in the projection section and an event log for the projection apparatus.

With this arrangement, when the error detection section detects an error, the error notification section carries out the predetermined notification using error information and an event log.

Thus, the predetermined notification enables the user to notice an error occurring in the projection section and obtain information on the error in the projection section and the history of operations of the projection apparatus.

Further, the error information and the event log are transmitted as notification information. It is thus possible to relatively accurately detect the cause of the error on the basis of the past usage and equipment information. Furthermore, subsequent action can be taken promptly to correct the error.

[Ninth Aspect]

Moreover, according to a ninth aspect of the present invention, the monitor system for a projection apparatus according to any of the second to eighth aspects of the present invention is characterized:

in that the error detection section compares the original projected image with the actual projected image to detect an error in the projection section on the basis of a match or difference between the original projected image and the actual projected image.

With this arrangement, the error detection section compares the original projected image with the actual projected image to detect an error in the projection section on the basis of a match or difference between the original projected image and the actual projected image.

Thus, the original projected image is compared with the actual projected image to detect an error in the projection section on the basis of a match or difference between the original projected image and the actual projected image. Consequently, errors in the display on the projection screen can be detected at a further detailed level. Further, searching for a match or a difference enables an erroneous part of the actual projected image to be detected relatively easily.

Here, the comparison of the images includes a comparison of image signals (or image information) that can constitute the images and a comparison of the image with the image signal or image information.

Further, the detection of an error includes detecting an error by, for example, continuously notifying the user of a normal state while the system is normal, carrying out no notification while the system is abnormal, and determining that an error is occurring when the notification is stopped.

[Tenth Aspect]

Moreover, according to a tenth aspect of the present invention, the monitor system for a projection apparatus according to the ninth aspect of the present invention is characterized:

in that the error detection section compares the original projected image with an actual projected image projected on the basis of the original projected image and then loaded into the image loading section at the same or at almost the same time as when the actual projected image is projected, to detect a difference between the original projected image and the actual projected image to detect an error in the projection section on the basis of the detected difference.

With this arrangement, the error detection section compares the original projected image with an actual projected image projected on the basis of the original projected image and then loaded at the same or at almost the same time as when the actual projected image is projected, to detect a difference between the original projected image and the actual projected image to detect an error in the projection section on the basis of the detected difference.

Thus, the original projected image is compared with an actual projected image loaded at the same or at almost the same time as when the original projected image is projected, to detect a difference between the original projected image and the actual projected image to detect an error in the projection section on the basis of the difference. Consequently, errors in the display on the projection screen can be relatively accurately detected.

Further, when the original projected image is compared with the actual projected image loaded into the image loading section, the compared images must be logically the same. Using the same or almost the same timing ensures that the images are logically the same. Consequently, an erroneous part can be detected relatively easily on the basis of a match or a difference.

[Eleventh Aspect]

Moreover, according to an eleventh aspect of the present invention, the monitor system for a projection apparatus according to the ninth aspect of the present invention is characterized:

in that the error detection section compares a projected image signal inputted to the projection section and which can construct the original projected image with a loaded image signal outputted by the image loading section and which can construct an actual projected image projected on the basis of the original projected image and then loaded into the image loading section at the same or almost the same time as when the actual projected image is projected, to detect a difference between the original projected image and the actual projected image to detect an error in the projection section on the basis of the detected difference.

With this arrangement, the error detection section compares a projected image signal which can construct the original projected image with a loaded image signal which can construct an actual projected image projected on the basis of the original projected image and then loaded at the same or almost the same time as when the actual projected image is projected, to detect a difference between the original projected image and the actual projected image to detect an error in the projection section on the basis of the detected difference.

Thus, a projected image signal which can construct the original projected image with a loaded image signal which can construct an actual projected image projected on the basis of the original projected image and then loaded at the same or almost the same time as when the actual projected image is projected, to detect a difference between the original projected image and the actual projected image to detect an error in the projection section on the basis of the difference. Consequently, errors in the display on the projection screen can be relatively accurately detected.

Further, by comparing the projected image signal with the loaded image signal loaded into the image loading section using the same timing as that for the projected image signal, a simple comparison circuit can be used to detect a difference between these signals.

[Twelfth Aspect]

Moreover, according to a twelfth aspect of the present invention, the monitor system for a projection apparatus according to the ninth aspect of the present invention is characterized:

the original projected image comprises original projected images in a plurality of different colors, the actual projected image is obtained by synthesizing actual projected images in the plurality of colors projected on the basis of the original projected images in the plurality of colors, the image loading section is monochrome sensors provided in association with the actual projected images in the plurality of colors so that the actual projected images in the plurality of colors can be loaded into the respective monochrome sensors, and the error detection section compares, for corresponding projected images in each color, the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section on the basis of the detected difference.

With this arrangement, actual projected images in the different colors can be loaded into the respective monochrome sensors. Then, the error detection section compares, for corresponding projected images in each color, the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section on the basis of the difference.

Thus, the original projected image is compared with an actual projected image loaded at the same or at almost the same time as when the original projected image is projected, to detect a difference between the original projected image and the actual projected image to detect an error in the projection section on the basis of the difference, and errors in the projection section are detected for the corresponding projected images in each color. Consequently, errors in the display on the projection screen can be relatively accurately detected for each color.

Further, by separately displaying images in a plurality of different colors and loading the images into the image loading section, one sensor (monochrome sensor) can be used to detect errors in an optical system for each color. As a result, an inexpensive sensor can be used to achieve an error detection section.

[Thirteenth Aspect]

Moreover, according to a thirteenth aspect of the present invention, the monitor system for a projection apparatus according to the ninth aspect of the present invention is characterized:

the original projected image comprises original projected images in a plurality of different colors, the actual projected image is obtained by synthesizing actual projected images in the plurality of colors projected on the basis of the original projected images in the plurality of colors, the image loading section is monochrome sensors provided in association with the actual projected images in the plurality of colors so that the actual projected images in the plurality of colors can be loaded into the respective monochrome sensors, and the error detection section compares, for corresponding projected images in each color, a projected image signal inputted to the projection section and which can construct the original projected images with a loaded image signal outputted by a corresponding one of the monochrome sensors and which can construct an actual projected image projected on the basis of the original projected image and then loaded into the monochrome sensor at the same or almost the same time as when the actual projected image is projected, to detect a difference between the original projected image and the actual projected image to detect an error in the projection section on the basis of the detected difference.

With this arrangement, actual projected images in the different colors can be loaded into the respective monochrome sensors. Then, the error detection section compares, for corresponding projected images in each color, a projected image signal which can construct the original projected images with a loaded image signal which can construct an actual projected image projected on the basis of the original projected image and then loaded into a corresponding one of the monochrome sensors at the same or almost the same time as when the actual projected image is projected, to detect a difference between the original projected image and the actual projected image to detect an error in the projection section on the basis of the detected difference.

Thus, a projected image signal which can construct the original projected images is compared with a loaded image signal which can construct an actual projected image projected on the basis of the original projected image and then loaded at the same or almost the same time as when the actual projected image is projected, to detect a difference between the original projected image and the actual projected image to detect an error in the projection section on the basis of the difference, and errors in the projection section are detected for the corresponding projected images in each color. Consequently, errors in the display on the projection screen can be relatively accurately detected for each color.

Further, by comparing outputs from the monochrome sensors in the form of image signals, errors can be detected using inexpensive sensors and inexpensive circuits.

[Fourteenth Aspect]

Moreover, according to a fourteenth aspect of the present invention, the monitor system for a projection apparatus according to either the twelfth or thirteenth aspect of the present invention is characterized:

in that the projection section includes image display section for displaying an image on the basis of the projected image signal or projected image information and a light source that irradiates the image displayed by the image display section with light to project the image on a screen, and the error detection section determines that an error is occurring in the light source when a predetermined threshold is exceeded for the corresponding projected images in one of the plurality of colors.

With this arrangement, in the projection apparatus, the image display section displays an image on the basis of a projected image signal or projected image information. The displayed image is irradiated with light from the light source and thus projected on the screen. That is, actual projected images in the respective colors are projected by irradiation with light from a single light source and are synthesized before being projected on the screen. Accordingly, if the actual projected images in the respective colors are all erroneous, an error is likely to be occurring in the light source. Therefore, if the difference between the corresponding projected images in any color exceeds a predetermined range, the error detection section determines that an error is occurring in the light source.

Thus, simply by comparing the original projected image with the actual projected image, it can be detected that an error is occurring in the light source.

Further, the amount of light from the light source varies owing to elapsed changes, and the brightness of the light varies owing to an external factor. Thus, by setting a variation caused by such a factor to be an allowable range, errors in the light source can be detected.

Furthermore, by detecting errors for each color, errors can be detected effectively even in a projection apparatus using, for example, separate light sources for the colors R, G, and B.

[Fifteenth Aspect]

Moreover, according to a fifteenth aspect of the present invention, the monitor system for a projection apparatus according to any of the second to fourteenth aspects of the present invention is characterized:

in that the error detection section calculates a difference between a pixel value for a predetermined position in the actual projected image and a pixel value for a position adjacent to the predetermined position in the actual projected image, to determine that an error is occurring in the projection section when the calculated difference exceeds a predetermined threshold.

With this arrangement, the error detection section calculates a difference between a pixel value for a predetermined position in the actual projected image and a pixel value for a position adjacent to the predetermined position in the actual projected image, to determine that an error is occurring in the projection section when the calculated difference exceeds a predetermined threshold.

Thus, errors in the projection section are detected on the basis of the difference between the adjacent pixels. Consequently, errors in the display on the projection screen can be detected relatively accurately.

Further, comparing the pixel values enables the detection of not only a local error in the projected image but also its cause. For example, an error in the light source can be determined from an error in brightness and an error in the light valve can be determined from an error in shade.

Here, the pixel value indicates the brightness and shade of the pixel, i.e. a luminance and a color difference.

[Sixteenth Aspect]

Moreover, according to a sixteenth aspect of the present invention, the monitor system for a projection apparatus according to any of the second to fifteenth aspects of the present invention is characterized:

in that the error detection section calculates a difference between a pixel value for a predetermined position in the actual projected image and a pixel value for a position separate from the predetermined position in the actual projected image, to determine that an error is occurring in the projection section when the calculated difference exceeds a predetermined threshold.

With this arrangement, the error detection section calculates a difference between a pixel value for a predetermined position in the actual projected image and a pixel value for a position separate from the predetermined position in the actual projected image, to determine that an error is occurring in the projection section when the calculated difference exceeds a predetermined threshold.

Thus, comparing the pixel values enables the detection of not only a local error in the projected image but also its cause. For example, an error in the light source can be determined from an error in brightness and an error in the light valve can be determined from an error in shade.

[Seventeenth Aspect]

Moreover, according to a seventeenth aspect of the present invention, the monitor system for a projection apparatus according to any of the second to sixteenth aspects of the present invention is characterized:

in that, for each of a plurality of detected positions in the actual projected image, the error detection section calculates a difference between a pixel value for the detected position in the actual projected image and a pixel value for a position adjacent to the detected position in the actual projected image, to determine that an error is occurring in the projection section when the sum of calculated differences exceeds a predetermined threshold.

With this arrangement, for each of a plurality of detected positions in the actual projected image, the error detection section calculates a difference between a pixel value for the detected position in the actual projected image and a pixel value for a position adjacent to the detected position in the actual projected image, to determine that an error is occurring in the projection section when the sum of calculated differences exceeds a predetermined threshold.

Thus, errors in projection section are detected on the basis of the sum of the differences between the adjacent pixels calculated for the plurality of inspected positions. Consequently, errors in the display on the projection screen can be detected relatively accurately.

Further, by comparing the pixel value for the inspected position with the pixel value for the adjacent position, the misalignment of the projected image can be absorbed. This prevents errors from being mistakenly detected.

It is also possible to detect errors that vary gradually with a position in a certain image area.

[Eighteenth Aspect]

Moreover, according to an eighteenth aspect of the present invention, the monitor system for a projection apparatus according to any of the fifteenth to seventeenth aspects of the present invention is characterized:

in that the pixel value is obtained by sampling a pixel value for the same position N (N is an integer equal to or larger than 1) times from a reference time t at predetermined intervals $\Delta t$ and adding the sampled pixel values together.

With this arrangement, a pixel value for the same position is sampled N times from a reference time t at predetermined intervals $\Delta t$, and the sampled pixel values are added together. Then, the error detection section calculates a difference on the basis of the pixel value as the result of the addition.

Thus, since the pixel value for the same position is sampled N times, errors during operation can be detected.

[Nineteenth Aspect]

Moreover, according to a nineteenth aspect of the present invention, the monitor system for a projection apparatus according to any of the second to eighteenth aspects of the present invention is characterized:

in that the same timing signal is inputted to the projection section and the image loading section, and a projection timing for the projection section is synchronized with a loading timing for the image loading section on the basis of the timing signal.

With this arrangement, the same timing signal is inputted to the projection section and the image loading section, and a projection timing for the projection section is synchronized with a loading timing for the image loading section on the basis of the timing signal.

Thus, the projection timing for the projection section is synchronized with the loading timing for the image loading section. Accordingly, it is possible to load the actual projected image corresponding to the original projected image. Consequently, errors in the display on the projection screen can be detected relatively accurately.

Further, since the projection and loading of the image are carried out using the same timing signal, logically the same images can be compared with each other. Consequently, comparisons can be achieved using inexpensive circuits.

[Twentieth Aspect]

On the other hand, to accomplish the above object, a twentieth aspect of the present inventionprovides a projection apparatus characterized by comprising projection section for projecting an image, image loading section for loading the actual projected image projected by the projection section, error detection section for detecting errors in the projection section on the basis of the actual projected image loaded into the image loading section, and error notification section for carrying out a predetermined notification when the error detection section detects an error, and in that the error detection section detects errors in the projection section on the basis of an original projected image to be projected by the projection section and the actual projected image loaded into the image loading section.

With this arrangement, in the projection apparatus, when the projection section projects an image, the projected actual projected image is loaded into the image loading section. The error detection section attempts to detect errors in the projection section on the basis of the original projected image to be projected by the projection section and the loaded actual projected image. When an error is detected, the error notification section carries out a predetermined notification.

This produces effects similar to those of the monitor system for a projection apparatus according to the second aspect of the present invention.

Here, the projection section is a mechanism for generating and projecting an image and includes a light source, the light valve (for example, a liquid crystal, a DMD, or an LCOS), a lens, and a panel driver. The projection apparatus includes the projection section.

[Twenty-First Aspect]

Moreover, according to a twenty-first aspect of the present invention, the projection apparatus according to the twentieth aspect of the present invention is characterized by being connected to a monitor center so as to communicate with the monitor center, and in that when the error detection section detects an error, the error notification section carries out a predetermined notification to notify the monitor center that the error is detected.

With this arrangement, with the projection apparatus, when the error detection section detects an error, the error notification section carries out a predetermined notification to notify the monitor center that the error has been detected.

This produces effects similar to those of the monitor system for a projection apparatus according to the fourth aspect of the present invention.

[Twenty-Second Aspect]

Moreover, a twenty-second aspect of the present invention provides a projection apparatus connected to a monitor center so as to communicate with the monitor center, the apparatus being characterized by comprising projection section for projecting an image, image loading section for loading the actual projected image projected by the projection section, error detection section for detecting errors in the projection section on the basis of the actual projected image loaded into the image loading section, and detection result providing section for providing an error detection result obtained by the error detection section in response to an access from the monitor center, and in that the error detection section detects errors in the projection section on the basis of an original projected image to be projected by the projection section and an actual projected image loaded into the image loading section, and the detection result providing section saves the error detection result obtained by the error detection section and provides the saved error detection result to the monitor center when the monitor center accesses the projection apparatus.

With this arrangement, in the projection apparatus, when the projection section projects an image, the projected actual projected image is loaded into the image loading section. The error detection section attempts to detect errors in the projection section on the basis of the original projected image to be projected by the projection section and the loaded actual projected image. Then, the detection result providing section saves the error detection result obtained by the error detection section and provides the saved error detection result to the monitor center when the monitor center accesses the projection apparatus.

On the other hand, when the monitor center accesses the projection apparatus, the detection result providing section provides the saved error detection result to the monitor center.

Thus, the error information is stored and provided to the monitor center when it accesses the projection apparatus. This eliminates the need to give notification to the monitor center at all times, thus reducing network traffic.

Further, storing the error information enables the cause of an error to be relatively accurately determined on the basis of the past information.

[Twenty-Third Aspect]

Moreover, according to a twenty-third aspect of the present invention, the projection apparatus according to any of the twentieth to twenty-second aspects of the present invention is characterized:

in that the projection section projects an image on a screen on the basis of a projected image signal or the projected image information, and the original projected image is constructed using the projected image signal or the projected image information.

With this arrangement, in the projection apparatus, the projection section projects an image on the screen on the basis of a projected image signal or projected image information. Then, the actual projected image projected by the projection section is loaded into the image loading section. The error detection section attempts to detect errors in the projection section on the basis of the original projected image constructed using the projected image signal or the projected image information and on the loaded actual projected image.

This produces effects similar to those of the monitor system for a projection apparatus according to the third aspect of the present invention.

Here, the projected image information is composed of colors resulting from color synthesis, i.e. an image that can be directly seen by human beings. Further, the projected image signal is inputted to a light valve, and in this signal, an image is divided into R, G, and B. Furthermore, the projected image signal contains a synchronous signal for drawing.

[Twenty-Fourth Aspect]

Furthermore, according to a twenty-fourth aspect of the present invention, the projection apparatus according to any of the twentieth to twenty-third aspects of the present invention is characterized:

in that the image loading section is a one-dimensional line sensor.

With this arrangement, the one-dimensional line sensor can obtain a line image from the actual projected image projected by the projection section.

This produces effects similar to those of the monitor system for a projection apparatus according to the fifth aspect of the present invention.

[Twenty-Fifth Aspect]

Moreover, according to a twenty-fifth aspect of the present invention, the projection apparatus according to the twenty-fourth aspect of the present invention is characterized:

in that the one-dimensional line sensor is adapted to obtain a horizontal line image from the actual projected image.

With this arrangement, the one-dimensional line sensor obtains a horizontal line image from the actual projected image projected by the projection section. Normally, line defects occur in both vertical and horizontal directions of the actual projected image. However, except for initial line defects, vertical line defects are more likely to occur. Thus, by loading a horizontal line image, vertical line defects can be detected.

This produces effects similar to those of the monitor system for a projection apparatus according to the sixth aspect of the present invention.

[Twenty-Sixth Aspect]

Moreover, according to a twenty-sixth aspect of the present invention, the projection apparatus according to any of the twentieth to twenty-third aspects of the present invention is characterized:

in that the image loading section is a two-dimensional area sensor.

With this arrangement, the two-dimensional area sensor is used to obtain an area image from the actual projected image projected by the projection section.

This produces effects similar to those of the monitor system for a projection apparatus according to the seventh aspect of the present invention.

[Twenty-Seventh Aspect]

Moreover, according to a twenty-seventh aspect of the present invention, the projection apparatus according to any of the twentieth to twenty-sixth aspects of the present invention is characterized:

in that the predetermined notification includes error information on an error in the projection section and an event log for the projection apparatus.

With this arrangement, when the error detection section detects an error, the error notification section carries out the predetermined notification using error information and an event log.

This produces effects similar to those of the monitor system for a projection apparatus according to the eighth aspect of the present invention.

[Twenty-Eighth Aspect]

Moreover, according to a twenty-eighth aspect of the present invention, the projection apparatus according to any of the twentieth to twenty-seventh aspects of the present invention is characterized:

in that the error detection section compares the original projected image with the actual projected image to detect an error in the projection section on the basis of a match or difference between the original projected image and the actual projected image.

With this arrangement, the error detection section compares the original projected image with the actual projected image to detect an error in the projection section on the basis of a match or difference between the original projected image and the actual projected image.

Here, the comparison of the images includes a comparison of image signals (or image information) that can constitute the images and a comparison of the image with the image signal or image information.

The above arrangement thus produces effects similar to those of the monitor system for a projection apparatus according to the ninth aspect of the present invention.

[Twenty-Ninth Aspect]

Moreover, according to a twenty-ninth aspect of the present invention, the projection apparatus according to the twenty-eighth aspect of the present invention is characterized:

in that the error detection section compares the original projected image with an actual projected image projected on the basis of the original projected image and then loaded into the image loading section at the same or at almost the same time as when the actual projected image is projected, to detect a difference between the original projected image and the actual projected image to detect an error in the projection section on the basis of the detected difference.

With this arrangement, the error detection section compares the original projected image with an actual projected image projected on the basis of the original projected image and then loaded at the same or at almost the same time as when the actual projected image is projected, to detect a difference between the original projected image and the actual projected image to detect an error in the projection section on the basis of the detected difference.

This produces effects similar to those of the monitor system for a projection apparatus according to the tenth aspect of the present invention.

[Thirtieth Aspect]

Moreover, according to a thirtieth aspect of the present invention, the projection apparatus according to the twenty-eighth aspect of the present invention is characterized:

in that the error detection section compares a projected image signal inputted to the projection section and which can construct the original projected image with a loaded image signal outputted by the image loading section and which can construct an actual projected image projected on the basis of the original projected image and then loaded into the image loading section at the same or almost the same time as when the actual projected image is projected, to detect a difference between the original projected image and the actual projected image to detect an error in the projection section on the basis of the detected difference.

With this arrangement, the error detection section compares a projected image signal which can construct the original projected image with a loaded image signal which can construct an actual projected image projected on the basis of the original projected image and then loaded at the same or almost the same time as when the actual projected image is projected, to detect a difference between the original projected image and the actual projected image to detect an error in the projection section on the basis of the detected difference.

This produces effects similar to those of the monitor system for a projection apparatus according to the eleventh aspect of the present invention.

[Thirty-First Aspect]

Moreover, according to a thirty-first aspect of the present invention, the projection apparatus according to the twenty-eighth aspect of the present invention is characterized:

in that the original projected image comprises original projected images in a plurality of different colors, the actual projected image is obtained by synthesizing actual projected images in the plurality of colors projected on the basis of the original projected images in the plurality of colors, the image loading section is monochrome sensors provided in association with the actual projected images in the plurality of colors so that the actual projected images in the plurality of colors can be loaded into the respective monochrome sensors, and the error detection section compares, for corresponding projected images in each color, the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section on the basis of the detected difference.

With this arrangement, actual projected images in the different colors can be loaded into the respective monochrome sensors. Then, the error detection section compares, for corresponding projected images in each color, the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section on the basis of the detected difference.

This produces effects similar to those of the monitor system for a projection apparatus according to the twelfth aspect of the present invention.

[Thirty-Second Aspect]

Moreover, according to a thirty-second aspect of the present invention, the projection apparatus according to the twenty-eighth aspect of the present invention is characterized:

in that the original projected image comprises original projected images in a plurality of different colors, the actual projected image is obtained by synthesizing actual projected images in the plurality of colors projected on the basis of the original projected images in the plurality of colors, the image loading section is monochrome sensors provided in association with the actual projected images in the plurality of colors so that the actual projected images in the plurality of colors can be loaded into the respective monochrome sensors, and the error detection section compares, for corresponding projected images in each color, a projected image signal inputted to the projection section and which can construct the original projected images with a loaded image signal outputted by a corresponding one of the monochrome sensors and which can construct an actual projected image projected on the basis of the original projected image and then loaded into the monochrome sensor at the same or almost the same time as when the actual projected image is projected, to detect a difference between the original projected image and the actual projected image to detect an error in the projection section on the basis of the detected difference.

With this arrangement, actual projected images in the different colors can be loaded into the respective monochrome sensors. Then, the error detection section compares, for corresponding projected images in each color, a projected image signal which can construct the original projected images with a loaded image signal which can construct an actual projected image projected on the basis of the original projected image and then loaded into a corresponding one of the monochrome sensors at the same or almost the same time as when the actual projected image is projected, to detect a difference between the original projected image and the actual projected image to detect an error in the projection section on the basis of the detected difference.

This produces effects similar to those of the monitor system for a projection apparatus according to the thirteenth aspect of the present invention.

[Thirty-Third Aspect]

Moreover, according to a thirty-third aspect of the present invention, the projection apparatus according to either the thirty-first or thirty-second aspect of the present invention is characterized:

in that the projection section includes image display section for displaying an image on the basis of the projected image signal or projected image information and a light source that irradiates the image displayed by the image display section with light to project the image on a screen, and the error detection section determines that an error is occurring in the light source when a predetermined threshold is exceeded for the corresponding projected images in one of the plurality of colors.

With this arrangement, in the projection apparatus, the image display section displays an image on the basis of a projected image signal or projected image information. The displayed image is irradiated with light from the light source and thus projected on the screen. That is, actual projected images in the respective colors are projected by irradiation with light from a single light source and are synthesized before being projected on the screen. Accordingly, if the actual projected images in the respective colors are all erroneous, an error is likely to be occurring in the light source. Therefore, if the difference between the corresponding projected images in any color exceeds a predetermined range, the error detection section determines that an error is occurring in the light source.

This produces effects similar to those of the monitor system for a projection apparatus according to the fourteenth aspect of the present invention.

[Thirty-Fourth Aspect]

Moreover, according to a thirty-fourth aspect of the present invention, the projection apparatus according to any of the twentieth to thirty-third aspects of the present invention is characterized:

in that the error detection section calculates a difference between a pixel value for a predetermined position in the actual projected image and a pixel value for a position adjacent to the predetermined position in the actual projected image, to determine that an error is occurring in the projection section when the calculated difference exceeds a predetermined threshold.

With this arrangement, the error detection section calculates a difference between a pixel value for a predetermined position in the actual projected image and a pixel value for a position adjacent to the predetermined position in the actual projected image, to determine that an error is occurring in the projection section when the calculated difference exceeds a predetermined threshold.

This produces effects similar to those of the monitor system for a projection apparatus according to the fifteenth aspect of the present invention.

[Thirty-Fifth Aspect]

Moreover, according to a thirty-fifth aspect of the present invention, the projection apparatus according to any of the twentieth to thirty-fourth aspects of the present invention is characterized:

in that the error detection section calculates a difference between a pixel value for a predetermined position in the actual projected image and a pixel value for a position separate from the predetermined position in the actual projected image, to determine that an error is occurring in the projection section when the calculated difference exceeds predetermined threshold.

With this arrangement, the error detection section calculates a difference between a pixel value for a predetermined position in the actual projected image and a pixel value for a position separate from the predetermined position in the actual projected image, to determine that an error is occurring in the projection section when the calculated difference exceeds a predetermined threshold.

This produces effects similar to those of the monitor system for a projection apparatus according to the sixteenth aspect of the present invention.

[Thirty-Sixth Aspect]

Moreover, according to a thirty-sixth aspect of the present invention, the projection apparatus according to any of the twentieth to thirty-fifth aspects of the present invention is characterized:

in that, for each of a plurality of detected positions in the actual projected image, the error detection section calculates a difference between a pixel value for the detected position in the actual projected image and a pixel value for a position adjacent to the detected position in the actual projected image, to determine that an error is occurring in the projection section when the sum of calculated differences exceeds a predetermined threshold.

With this arrangement, for each of a plurality of detected positions in the actual projected image, the error detection section calculates a difference between a pixel value for the detected position in the actual projected image and a pixel value for a position adjacent to the detected position in the actual projected image, to determine that an error is occurring in the projection section when the sum of calculated differences exceeds a predetermined threshold.

This produces effects similar to those of the monitor system for a projection apparatus according to the seventeenth aspect of the present invention.

[Thirty-Seventh Aspect]

Moreover, according to a thirty-seventh aspect of the present invention, the projection apparatus according to any of the thirty-fourth to thirty-sixth aspects of the present invention is characterized:

in that the pixel value is obtained by sampling a pixel value for the same position N (N is an integer equal to or larger than 1) times from a reference time t at predetermined intervals $\Delta t$ and adding the sampled pixel values together.

With this arrangement, a pixel value for the same position is sampled N times from a reference time t at predetermined intervals $\Delta t$, and the sampled pixel values are added together. Then, the error detection section calculates a difference on the basis of the pixel value as the result of the addition.

This produces effects similar to those of the monitor system for a projection apparatus according to the eighteenth aspect of the present invention.

[Thirty-Eighth Aspect]

Moreover, according to a thirty-eighth aspect of the present invention, the projection apparatus according to any of the twentieth to thirty-seventh aspects of the present invention is characterized:

in that the same timing signal is inputted to the projection section and the image loading section, and a projection timing for the projection section is synchronized with a loading timing for the image loading section on the basis of the timing signal.

With this arrangement, the same timing signal is inputted to the projection section and the image loading section, and a projection timing for the projection section is synchronized with a loading timing for the image loading section on the basis of the timing signal.

This produces effects similar to those of the monitor system for a projection apparatus according to the nineteenth aspect of the present invention.

[Thirty-Ninth Aspect]

On the other hand, to accomplish the above object, a thirty-ninth aspect of the present invention provides a monitor program for a projection apparatus, the program monitoring a projection apparatus having projection section for projecting an image, the program being characterized by comprising:

allowing a computer to execute a process of loading an actual projected image projected by the projection section and detecting an error in the projection section on the basis of the loaded actual projected image.

With this arrangement, when the computer reads the program and then executes the process in accordance with the read program, operations and effects can be accomplished which are similar to those of the monitor system for a projection apparatus according to the first aspect of the present invention.

[Fortieth Aspect]

Moreover, a fortieth aspect of the present invention provides a monitor program for a projection apparatus, the program being executed by a projection apparatus having projection section for projecting an image and comprising a computer, the program being characterized by comprising:

allowing execution of a process implemented as image loading section for loading the actual projected image projected by the projection section, error detection section for detecting errors in the projection section on the basis of the actual projected image loaded into the image loading section, and error notification section for carrying out a predetermined notification when the error detection section detects an error, and in that the error detection section detects errors in the projection section on the basis of an original projected image to be projected by the projection section and the actual projected image loaded into the image loading section.

With this arrangement, when the computer reads the program and then executes the process in accordance with the read program, operations and effects can be accomplished which are similar to those of the monitor system for a projection apparatus according to the twentieth aspect of the present invention.

Here, the projection section is a mechanism for generating and projecting an image and includes a light source, the light valve (for example, a liquid crystal, a DMD, or an LCOS), a lens, and a panel driver. The projection apparatus includes the projection section.

[Forty-First Aspect]

Moreover, according to a forty-first aspect of the present invention, the monitor program for a projection apparatus according to the fortieth aspect of the present invention is characterized:

in that the projection apparatus is connected to a monitor center so as to communicate with the monitor center, and when the error detection section detects an error, the error notification section carries out a predetermined notification to notify the monitor center that the error has been detected.

With this arrangement, when the computer reads the program and then executes the process in accordance with the read program, operations and effects can be accomplished which are similar to those of the monitor system for a projection apparatus according to the twenty-first aspect of the present invention.

[Forty-Second Aspect]

Moreover, a forty-second aspect of the present invention provides a monitor program for a projection apparatus connected to a monitor center so as to communicate with the monitor center, having projection section for projecting an image, and comprising a computer, the program being executed by the projection apparatus, the program being characterized by comprising:

allowing execution of a process implemented as image loading section for loading the actual projected image projected by the projection section, error detection section for detecting errors in the projection section on the basis of the actual projected image loaded into the image loading section, and detection result providing section for providing an error detection result obtained by the error detection section in response to an access from the monitor center, and in that the error detection section detects errors in the projection section on the basis of an original projected image to be projected by the projection section and an actual projected image loaded into the image loading section, and the detection result providing section saves the error detection result obtained by the error detection section and provides the saved error detection result to the monitor center when the monitor center accesses the projection apparatus.

With this arrangement, when the computer reads the program and then executes the process in accordance with the read program, operations and effects can be accomplished which are similar to those of the monitor system for a projection apparatus according to the twenty-second aspect of the present invention.

[Forty-Third Aspect]

Moreover, according to a forty-third aspect of the present invention, the monitor program for a projection apparatus according to any of the fortieth to forty-second aspects of the present invention is characterized:

in that the projection section projects an image on a screen on the basis of a projected image signal or the projected image information, and the original projected image is constructed using the projected image signal or the projected image information.

With this arrangement, when the computer reads the program and then executes the process in accordance with the read program, operations and effects can be accomplished which are similar to those of the monitor system for a projection apparatus according to the twenty-third aspect of the present invention.

Here, the projected image information is composed of colors resulting from color synthesis, i.e. an image that can be directly seen by human beings. Further, the projected image signal is inputted to a light valve, and in this signal, an image is divided into R, G, and B. Furthermore, the projected image signal contains a synchronous signal for drawing.

[Forty-Fourth Aspect]

Moreover, according to a forty-fourth aspect of the present invention, the monitor program for a projection apparatus according to any of the fortieth to forty-third aspects of the present invention is characterized:

in that the image loading section utilizes a one-dimensional line sensor to obtain the actual projected image.

With this arrangement, when the computer reads the program and then executes the process in accordance with the read program, operations and effects can be accomplished which are similar to those of the monitor system for a projection apparatus according to the twenty-fourth aspect of the present invention.

[Forty-Fifth Aspect]

Moreover, according to a forty-fifth aspect of the present invention, the monitor program for a projection apparatus according to the forty-fourth aspect of the present invention is characterized:

in that the one-dimensional line sensor is adapted to obtain a horizontal line image from the actual projected image.

With this arrangement, when the computer reads the program and then executes the process in accordance with the read program, operations and effects can be accomplished which are similar to those of the monitor system for a projection apparatus according to the twenty-fifth aspect of the present invention.

[Forty-Sixth Aspect]

Moreover, according to a forty-sixth aspect of the present invention, the monitor program for a projection apparatus according to any of the fortieth to forty-third aspects of the present invention is characterized:

in that the image loading section utilizes a two-dimensional area sensor to obtain the actual projected image.

With this arrangement, when the computer reads the program and then executes the process in accordance with the read program, operations and effects can be accomplished which are similar to those of the monitor system for a projection apparatus according to the twenty-sixth aspect of the present invention.

[Forty-Seventh Aspect]

Moreover, according to a forty-seventh aspect of the present invention, the monitor program for a projection apparatus according to any of the fortieth to forty-sixth aspects of the present invention is characterized:

in that the predetermined notification includes error information on an error in the projection section and an event log for the projection apparatus.

With this arrangement, when the computer reads the program and then executes the process in accordance with the read program, operations and effects can be accomplished which are similar to those of the monitor system for a projection apparatus according to the twenty-seventh aspect of the present invention.

[Forty-Eighth Aspect]

Moreover, according to a forty-eighth aspect of the present invention, the monitor program for a projection apparatus according to any of the fortieth to forty-seventh aspects of the present invention is characterized:

in that the error detection section compares the original projected image with the actual projected image to detect an error in the projection section on the basis of a match or difference between the original projected image and the actual projected image.

With this arrangement, when the computer reads the program and then executes the process in accordance with the read program, operations and effects can be accomplished which are similar to those of the monitor system for a projection apparatus according to the twenty-eighth aspect of the present invention.

[Forty-Ninth Aspect]

Moreover, according to a forty-ninth aspect of the present invention, the monitor program for a projection apparatus according to the forty-eighth aspect of the present invention is characterized:

in that the error detection section compares the original projected image with an actual projected image projected on the basis of the original projected image and then loaded into the image loading section at the same or at almost the same time as when the actual projected image is projected, to detect a difference between the original projected image and the actual projected image to detect an error in the projection section on the basis of the detected difference.

With this arrangement, when the computer reads the program and then executes the process in accordance with the read program, operations and effects can be accomplished which are similar to those of the monitor system for a projection apparatus according to the twenty-ninth aspect of the present invention.

[Fiftieth Aspect]

Moreover, according to a fiftieth aspect of the present invention, the monitor program for a projection apparatus according to the forty-eighth aspect of the present invention is characterized:

in that the error detection section compares a projected image signal inputted to the projection section and which can construct the original projected image with a loaded image signal outputted by the image loading section and which can construct an actual projected image projected on the basis of the original projected image and then loaded into the image loading section at the same or almost the same time as when the actual projected image is projected, to detect a difference between the original projected image and the actual projected image to detect an error in the projection section on the basis of the detected difference.

With this arrangement, when the computer reads the program and then executes the process in accordance with the read program, operations and effects can be accomplished which are similar to those of the monitor system for a projection apparatus according to the thirtieth aspect of the present invention.

[Fifty-First Aspect]

Moreover, according to a fifty-first aspect of the present invention, the monitor program for a projection apparatus according to the forty-eighth aspect of the present invention is characterized:

in that the original projected image comprises original projected images in a plurality of different colors, the actual projected image is obtained by synthesizing actual projected images in the plurality of colors projected on the basis of the original projected images in the plurality of colors, the image loading section is monochrome sensors provided in association with the actual projected images in the plurality of colors so that the actual projected images in the plurality of colors can be loaded into the respective monochrome sensors, and the error detection section compares, for corresponding projected images in each color, the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section on the basis of the detected difference.

With this arrangement, when the computer reads the program and then executes the process in accordance with the read program, operations and effects can be accomplished which are similar to those of the monitor system for a projection apparatus according to the thirty-first aspect of the present invention.

[Fifty-Second Aspect]

Moreover, according to a fifty-second aspect of the present invention, the monitor program for a projection apparatus according to the forty-eighth aspect of the present invention is characterized:

in that the original projected image comprises original projected images in a plurality of different colors, the actual projected image is obtained by synthesizing actual projected images in the plurality of colors projected on the basis of the original projected images in the plurality of colors, the image loading section is monochrome sensors provided in association with the actual projected images in the plurality of colors so that the actual projected images in the plurality of colors can be loaded into the respective monochrome sensors, and the error detection section compares, for corresponding projected images in each color, a projected image signal inputted to the projection section and which can construct the original projected images with a loaded image signal outputted by a corresponding one of the monochrome sensors and which can construct an actual projected image projected on the basis of the original projected image and then loaded into the monochrome sensor at the same or almost the same time as when the actual projected image is projected, to detect a difference between the original projected image and the actual projected image to detect an error in the projection section on the basis of the detected difference.

With this arrangement, when the computer reads the program and then executes the process in accordance with the read program, operations and effects can be accomplished which are similar to those of the monitor system for a projection apparatus according to the thirty-second aspect of the present invention.

[Fifty-Third Aspect]

Moreover, according to a fifty-third aspect of the present invention, the monitor program for a projection apparatus according to either the fifty-first or fifty-second aspect of the present invention is characterized:

in that the projection section includes image display section for displaying an image on the basis of the projected image signal or projected image information and a light source that irradiates the image displayed by the image display section with light to project the image on a screen, and the error detection section determines that an error is occurring in the light source when a predetermined threshold is exceeded for the corresponding projected images in one of the plurality of colors.

With this arrangement, when the computer reads the program and then executes the process in accordance with the read program, operations and effects can be accomplished which are similar to those of the monitor system for a projection apparatus according to the thirty-third aspect of the present invention.

[Fifty-Fourth Aspect]

Moreover, according to a fifty-fourth aspect of the present invention, the monitor program for a projection apparatus according to any of the fortieth to fifty-third aspects of the present invention is characterized:

in that the error detection section calculates a difference between a pixel value for a predetermined position in the actual projected image and a pixel value for a position adjacent to the predetermined position in the actual projected image, to determine that an error is occurring in the projection section when the calculated difference exceeds a predetermined threshold.

With this arrangement, when the computer reads the program and then executes the process in accordance with the read program, operations and effects can be accomplished which are similar to those of the monitor system for a projection apparatus according to the thirty-fourth aspect of the present invention.

[Fifty-Fifth Aspect]

Moreover, according to a fifty-fifth aspect of the present invention, the monitor program for a projection apparatus according to any of the fortieth to fifty-fourth aspects of the present invention is characterized:

in that the error detection section calculates a difference between a pixel value for a predetermined position in the actual projected image and a pixel value for a position separate from the predetermined position in the actual projected image, to determine that an error is occurring in the projection section when the calculated difference exceeds a predetermined threshold.

With this arrangement, when the computer reads the program and then executes the process in accordance with the read program, operations and effects can be accomplished which are similar to those of the monitor system for a projection apparatus according to the thirty-fifth aspect of the present invention.

[Fifty-Sixth Aspect]

Moreover, according to a fifty-sixth aspect of the present invention, the monitor program for a projection apparatus according to any of the fortieth to fifty-fifth aspects of the present invention is characterized:

in that, for each of a plurality of detected positions in the actual projected image, the error detection section calculates a difference between a pixel value for the detected position in the actual projected image and a pixel value for a position adjacent to the detected position in the actual projected image, to determine that an error is occurring in the projection section when the sum of calculated differences exceeds a predetermined threshold.

With this arrangement, when the computer reads the program and then executes the process in accordance with the read program, operations and effects can be accomplished which are similar to those of the monitor system for a projection apparatus according to the thirty-sixth aspect of the present invention.

[Fifty-Seventh Aspect]

Moreover, according to a fifty-seventh aspect of the present invention, the monitor program for a projection apparatus according to any of the fifty-fourth to fifty-sixth aspects of the present invention is characterized:

in that the pixel value is obtained by sampling a pixel value for the same position N (N is an integer equal to or larger than 1) times from a reference time t at predetermined intervals $\Delta t$ and adding the sampled pixel values together.

With this arrangement, when the computer reads the program and then executes the process in accordance with the read program, operations and effects can be accomplished which are similar to those of the monitor system for a projection apparatus according to the thirty-seventh aspect of the present invention.

[Fifty-Eighth Aspect]

Moreover, according to a fifty-eighth aspect of the present invention, the monitor program for a projection apparatus according to any of the fortieth to fifty-seventh aspects of the present invention is characterized:

in that the same timing signal is inputted to the projection section and the image loading section, and a projection timing for the projection section is synchronized with a loading timing for loading the actual projected image on the basis of the timing signal.

With this arrangement, when the computer reads the program and then executes the process in accordance with the read program, operations and effects can be accomplished which are similar to those of the monitor system for a projection apparatus according to the thirty-eighth aspect of the present invention.

[Fifty-Ninth Aspect]

On the other hand, to accomplish the above object, a fifty-ninth aspect of the present invention provides a monitor method for a projection apparatus, the method monitoring a projection apparatus having projection section for projecting an image, the method being characterized by comprising:

loading an actual projected image projected by the projection section and detecting an error in the projection section on the basis of the loaded actual projected image.

This produces effects equivalent to those of the monitor system for a projection apparatus according to the first aspect of the present invention.

[Sixtieth Aspect]

Moreover, a sixtieth aspect of the present invention provides a monitor method for a projection apparatus, the method monitoring a projection apparatus having projection section for projecting an image, the method being characterized by comprising:

an image loading step of loading the actual projected image projected by the projection section, an error detection step of detecting an error in the projection section on the basis of the actual projected image loaded in the image loading step, and an error notification step of carrying out a predetermined notification when an error is detected in the error detection step, and in that the error detection step detects an error in the projection section on the basis of an original projected image to be projected by the projection section and the actual projected image loaded in the image loading step.

This produces effects equivalent to those of the projection apparatus according to the twentieth aspect of the present invention.

Here, the projection section is a mechanism for generating and projecting an image and includes a light source, the light valve (for example, a liquid crystal, a DMD, or an LCOS), a lens, and a panel driver. The projection apparatus includes the projection section.

[Sixty-First Aspect]

Moreover, according to a sixty-first aspect of the present invention, the monitor method for a projection apparatus according to the sixtieth aspect of the present invention is characterized:

in that the projection apparatus is connected to a monitor center so as to communicate with the monitor center, and when the error detection step detects an error, the error notification step carries out a predetermined notification to notify the monitor center that the error has been detected.

This produces effects equivalent to those of the projection apparatus according to the twenty-first aspect of the present invention.

[Sixty-Second Aspect]

Moreover, a sixty-second aspect of the present invention provides a monitor method for a projection apparatus connected to a monitor center so as to communicate with the monitor center and having projection section for projecting an image, the method being characterized by comprising:

an image loading step of loading the actual projected image projected by the projection section, an error detection step of detecting an error in the projection section on the basis of the actual projected image loaded in the image loading step, and a detection result providing step of providing an error detection result obtained in the error detection step in response to an access from the monitor center, and in that the error detection step detects an error in the projection section on the basis of an original projected image to be projected by the projection section and an actual projected image loaded in the image loading step, and the detection result providing step saves the error detection result obtained in the error detection step and provides the saved error detection result to the monitor center when the monitor center accesses the projection apparatus.

This produces effects equivalent to those of the projection apparatus according to the twenty-second aspect of the present invention.

[Sixty-Third Aspect]

Moreover, according to a sixty-third aspect of the present invention, the monitor method for a projection apparatus according to any of the sixtieth to sixty-second aspects of the present invention is characterized:

in that the projection section projects an image on a screen on the basis of a projected image signal or the projected image information, and the original projected image is constructed using the projected image signal or the projected image information.

This produces effects equivalent to those of the projection apparatus according to the twenty-third aspect of the present invention.

Here, the projected image information is composed of colors resulting from color synthesis, i.e. an image that can be directly seen by human beings. Further, the projected image signal is inputted to a light valve, and in this signal, an image is divided into R, G, and B. Furthermore, the projected image signal contains a synchronous signal for drawing.

[Sixty-Fourth Aspect]

Moreover, according to a sixty-fourth aspect of the present invention, the monitor method for a projection apparatus according to any of the sixtieth to sixty-third aspects of the present invention is characterized:

in that the image loading step utilizes a one-dimensional line sensor to obtain the actual projected image.

This produces effects equivalent to those of the projection apparatus according to the twenty-fourth aspect of the present invention.

[Sixty-Fifth Aspect]

Moreover, according to a sixty-fifth aspect of the present invention, the monitor method for a projection apparatus according to the sixty-fourth aspect of the present invention is characterized:

in that the one-dimensional line sensor is adapted to obtain a horizontal line image from the actual projected image.

This produces effects equivalent to those of the projection apparatus according to the twenty-fifth aspect of the present invention.

[Sixty-Sixth Aspect]

Moreover, according to a sixty-sixth aspect of the present invention, the monitor method for a projection apparatus according to any of the sixtieth to sixty-third aspects of the present invention is characterized:

in that the image loading step utilizes a two-dimensional area sensor to obtain the actual projected image.

This produces effects equivalent to those of the projection apparatus according to the twenty-sixth aspect of the present invention.

[Sixty-Seventh Aspect]

Moreover, according to a sixty-seventh aspect of the present invention, the monitor method for a projection apparatus according to any of the sixtieth to sixty-sixth aspects of the present invention is characterized:

in that the predetermined notification includes error information on an error in the projection section and an event log for the projection apparatus.

This produces effects equivalent to those of the projection apparatus according to the twenty-seventh aspect of the present invention.

[Sixty-Eighth Aspect]

Moreover, according to a sixty-eighth aspect of the present invention, the monitor method for a projection apparatus according to any of the sixtieth to sixty-seventh aspects of the present invention is characterized:

in that the error detection step compares the original projected image with the actual projected image to detect an error in the projection section on the basis of a match or difference between the original projected image and the actual projected image.

This produces effects equivalent to those of the projection apparatus according to the twenty-eighth aspect of the present invention.

[Sixty-Ninth Aspect]

Moreover, according to a sixty-ninth aspect of the present invention, the monitor method for a projection apparatus according to the sixty-eighth aspect of the present invention is characterized:

in that the error detection step compares the original projected image with an actual projected image projected on the basis of the original projected image and then loaded in the image loading step at the same or at almost the same time as when the actual projected image is projected, to detect a difference between the original projected image and the actual projected image to detect an error in the projection section on the basis of the detected difference.

This produces effects equivalent to those of the projection apparatus according to the twenty-ninth aspect of the present invention.

[Seventieth Aspect]

Moreover, according to a seventieth aspect of the present invention, the monitor method for a projection apparatus according to the sixty-eighth aspect of the present invention is characterized:

in that the error detection step compares a projected image signal inputted to the projection section and which can construct the original projected image with a loaded image signal outputted in the image loading step and which can construct an actual projected image projected on the basis of the original projected image and then loaded in the image loading step at the same or almost the same time as when the actual projected image is projected, to detect a difference between the original projected image and the actual projected image to detect an error in the projection section on the basis of the detected difference.

This produces effects equivalent to those of the projection apparatus according to the thirtieth aspect of the present invention.

[Seventy-First Aspect]

Moreover, according to a seventy-first aspect of the present invention, the monitor method for a projection apparatus according to the sixty-eighth aspect of the present invention is characterized:

in that the original projected image comprises original projected images in a plurality of different colors, the actual projected image is obtained by synthesizing actual projected images in the plurality of colors projected on the basis of the original projected images in the plurality of colors, the image loading step utilizes monochrome sensors provided in association with the actual projected images in the plurality of colors, so that the actual projected images in the plurality of colors can be loaded into the respective monochrome sensors, and the error detection step compares, for corresponding projected images in each color, the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section on the basis of the detected difference.

This produces effects equivalent to those of the projection apparatus according to the thirty-first aspect of the present invention.

[Seventy-Second Aspect]

Moreover, according to a seventy-second aspect of the present invention, the monitor method for a projection apparatus according to the sixty-eighth aspect of the present invention is characterized:

in that the original projected image comprises original projected images in a plurality of different colors, the actual projected image is obtained by synthesizing actual projected images in the plurality of colors projected on the basis of the original projected images in the plurality of colors, the image loading step utilizes monochrome sensors provided in association with the actual projected images in the plurality of colors, so that the actual projected images in the plurality of colors can be loaded into the respective monochrome sensors, and the error detection step compares, for corresponding projected images in each color, a projected image signal inputted to the projection section and which can construct the original projected images with a loaded image signal outputted by a corresponding one of the monochrome sensors and which can construct an actual projected image projected on the basis of the original projected image and then loaded into the monochrome sensor at the same or almost the same time as when the actual projected image is projected, to detect a difference between the original projected image and the actual projected image to detect an error in the projection section on the basis of the detected difference.

This produces effects equivalent to those of the projection apparatus according to the thirty-second aspect of the present invention.

[Seventy-Third Aspect]

Moreover, according to a seventy-third aspect of the present invention, the monitor method for a projection apparatus according to either the seventy-first or seventy-second aspect of the present invention is characterized:

in that the projection section includes image display section for displaying an image on the basis of the projected image signal or projected image information and a light source that irradiates the image displayed by the image display section with light to project the image on a screen, and the error detection step determines that an error is occurring in the light source when a predetermined threshold is exceeded for the corresponding projected images in one of the plurality of colors.

This produces effects equivalent to those of the projection apparatus according to the thirty-third aspect of the present invention.

29

[Seventy-Fourth Aspect]

Moreover, according to a seventy-fourth aspect of the present invention, the monitor method for a projection apparatus according to any of the sixtieth to seventy-third aspects of the present invention is characterized:

in that the error detection step calculates a difference between a pixel value for a predetermined position in the actual projected image and a pixel value for a position adjacent to the predetermined position in the actual projected image, to determine that an error is occurring in the projection section when the calculated difference exceeds a predetermined threshold.

This produces effects equivalent to those of the projection apparatus according to the thirty-fourth aspect of the present invention.

[Seventy-Fifth Aspect]

Moreover, according to a seventy-fifth aspect of the present invention, the monitor method for a projection apparatus according to any of the sixtieth to seventy-fourth aspects of the present invention is characterized:

in that the error detection step calculates a difference between a pixel value for a predetermined position in the actual projected image and a pixel value for a position separate from the predetermined position in the actual projected image, to determine that an error is occurring in the projection section when the calculated difference exceeds a predetermined threshold.

This produces effects equivalent to those of the projection apparatus according to the thirty-fifth aspect of the present invention.

[Seventy-Sixth Aspect]

Moreover, according to a seventy-sixth aspect of the present invention, the monitor method for a projection apparatus according to any of the sixtieth to seventy-fifth aspects of the present invention is characterized:

in that, for each of a plurality of detected positions in the actual projected image, the error detection step calculates a difference between a pixel value for the detected position in the actual projected image and a pixel value for a position adjacent to the detected position in the actual projected image, to determine that an error is occurring in the projection section when the sum of calculated differences exceeds a predetermined threshold.

This produces effects equivalent to those of the projection apparatus according to the thirty-sixth aspect of the present invention.

[Seventy-Seventh Aspect]

Moreover, according to a seventy-seventh aspect of the present invention, the monitor method for a projection apparatus according to any of the seventy-fourth to seventy-sixth aspects of the present invention is characterized:

in that the pixel value is obtained by sampling a pixel value for the same position N (N is an integer equal to or larger than 1) times from a reference time t at predetermined intervals $\Delta t$ and adding the sampled pixel values together.

This produces effects equivalent to those of the projection apparatus according to the thirty-seventh aspect of the present invention.

[Seventy-Eighth Aspect]

Moreover, according to a seventy-eighth aspect of the present invention, the monitor method for a projection apparatus according to any of the sixtieth to seventy-seventh aspects of the present invention is characterized:

in that the image loading step uses the same timing signal inputted to the projection section, and a projection timing for the projection section is synchronized with a loading timing for loading the actual projected image on the basis of the timing signal.

This produces effects equivalent to those of the projection apparatus according to the thirty-eighth aspect of the present invention.

DETAILED DESCRIPTION OF THE PREFERRED EMBODIMENTS

Embodiments of the present invention will be described below with reference to the drawings. FIGS. 1 to 5 are views showing a monitor system for a projection apparatus, a projection apparatus, a monitor program for a projection apparatus, and a monitor method for a projection apparatus according to the present invention.

Figure 1:
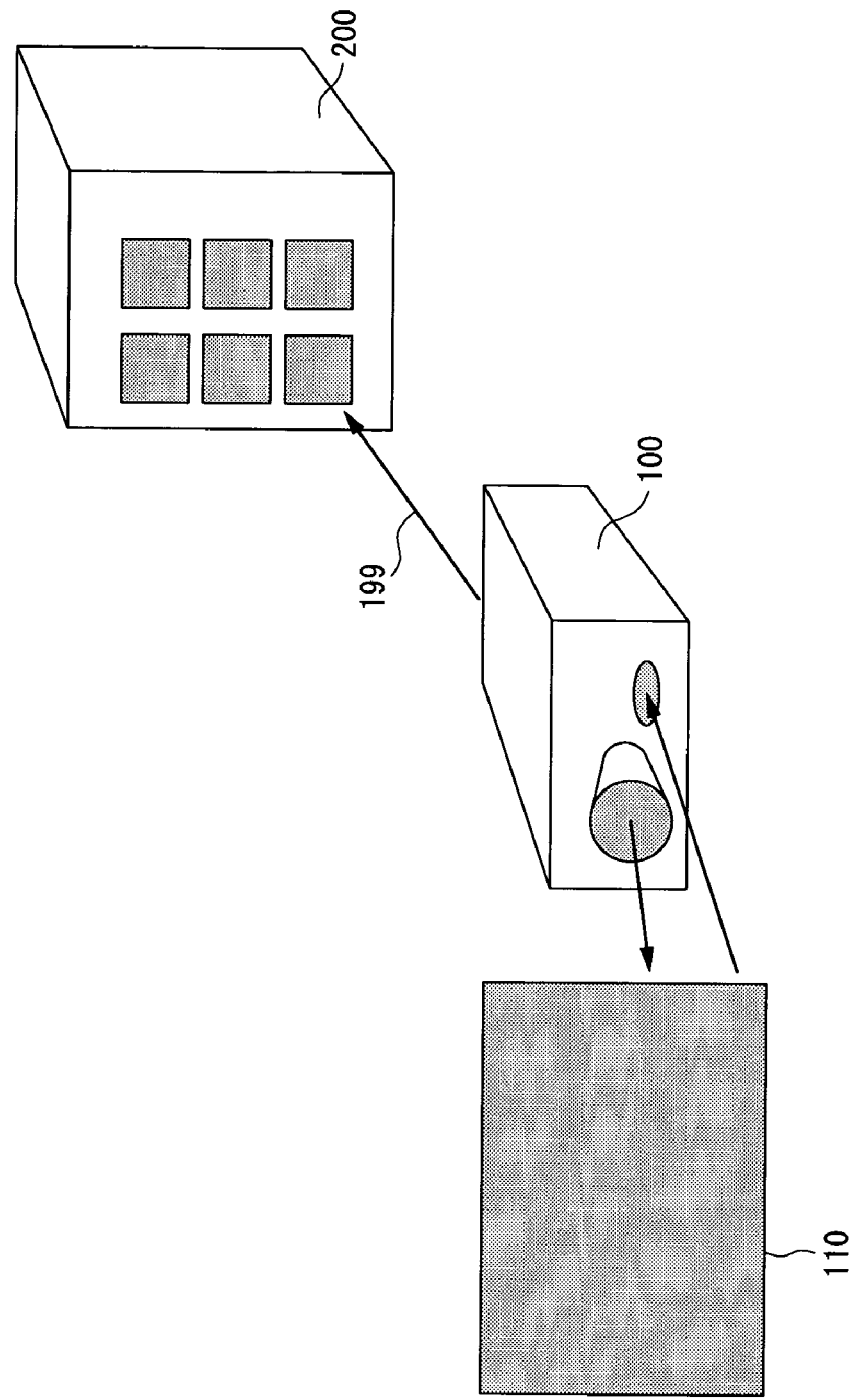
FIG. 1 is a block diagram showing a configuration of a network system to which the present invention is applied.

In the present embodiment, the monitor system for a projection apparatus, the projection apparatus, the monitor program for a projection apparatus, and the monitor method for a projection apparatus according to the present invention are applied to the case in which an error in a projection apparatus 100 is detected and in which a monitor center 200 is then notified of this error as shown in FIG. 1.

First, with reference to FIG. 1, description will be given of a configuration of a network system to which the present invention is applied. FIG. 1 is a block diagram showing the configuration of the network system to which the present invention is applied.

The Internet 199 connects to the projection apparatus 100, which projects an image on a screen 110, and the monitor center 200, which monitors the projection apparatus 100, as shown in FIG. 1. For easy understanding, only the one projection apparatus 100 is illustrated. However, actually, a plurality of projection apparatuses 100 are connected to the Internet 199.

Now, a configuration of the projection apparatus 100 will be described in detail with reference to FIG. 2. This figure is a block diagram showing the configuration of the projection apparatus 100.

Figure 2:
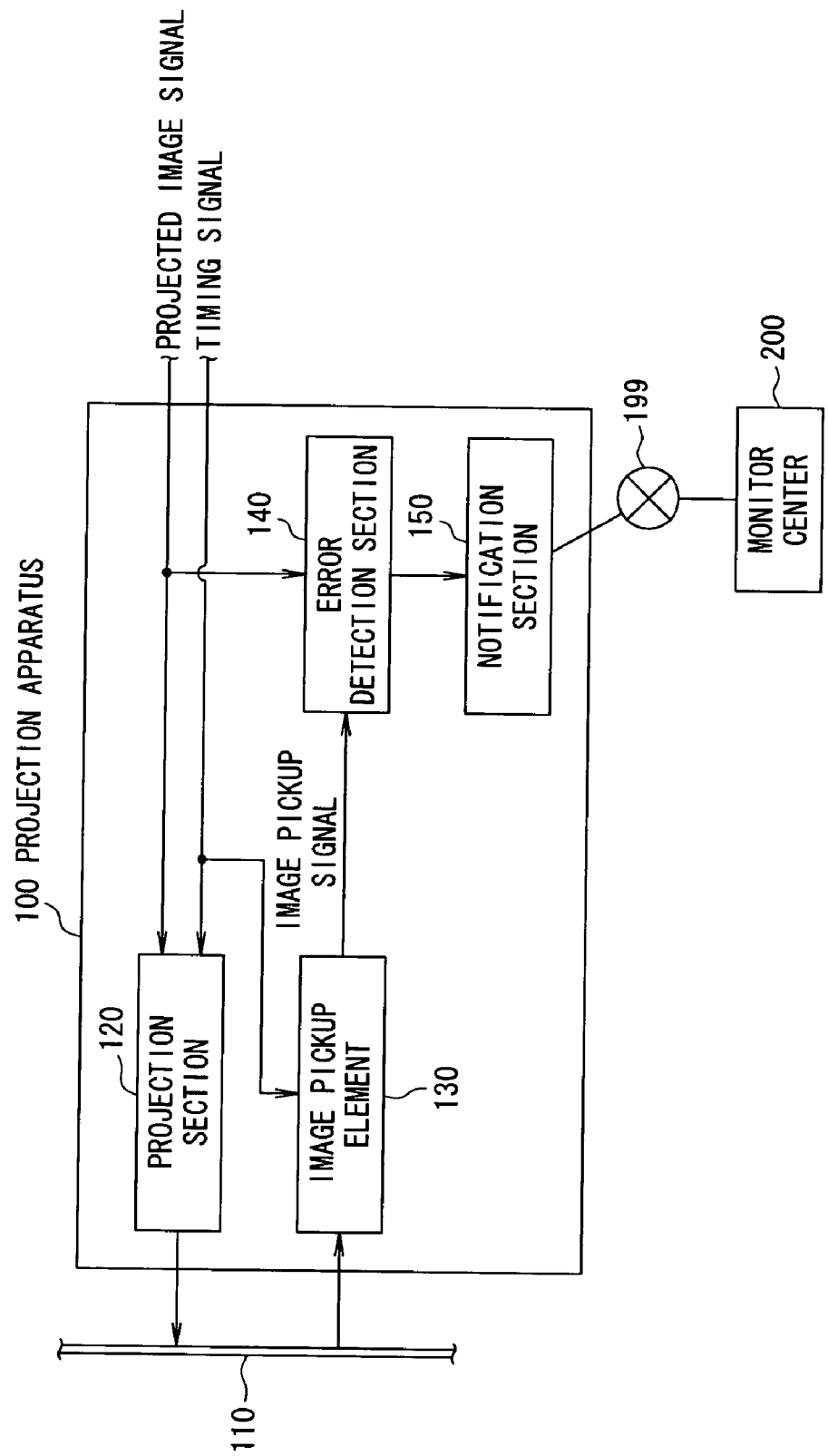
FIG. 2 is a block diagram showing a configuration of a projection apparatus 100.

As shown in FIG. 2, the projection apparatus 100 is composed of a projection section 120 that projects an image on a screen 110 on the basis of a projected image signal provided by a PC or the like (not shown), an image pickup element 130 into which the image projected on the screen 110 is loaded, an error detection section 140 that detects errors in the projection section 120 on the basis of the projected image signal and an image pickup signal from the image pickup element 130, and a notification section 150 that carries out a predetermined notification when the error detection section 140 detects an error. An ideal projected image constructed by the projected image signal will hereinafter be referred to as an original projected image. The image actually projected on the screen 110 will hereinafter be referred to as an actual projected image.

Here, errors in the projection section 120 include the burnout of a lamp, point and line defects in a light valve, the nonuniformity of colors, the nonuniformity of the amount of light, and the degradation of the lamp.

Figure 3:
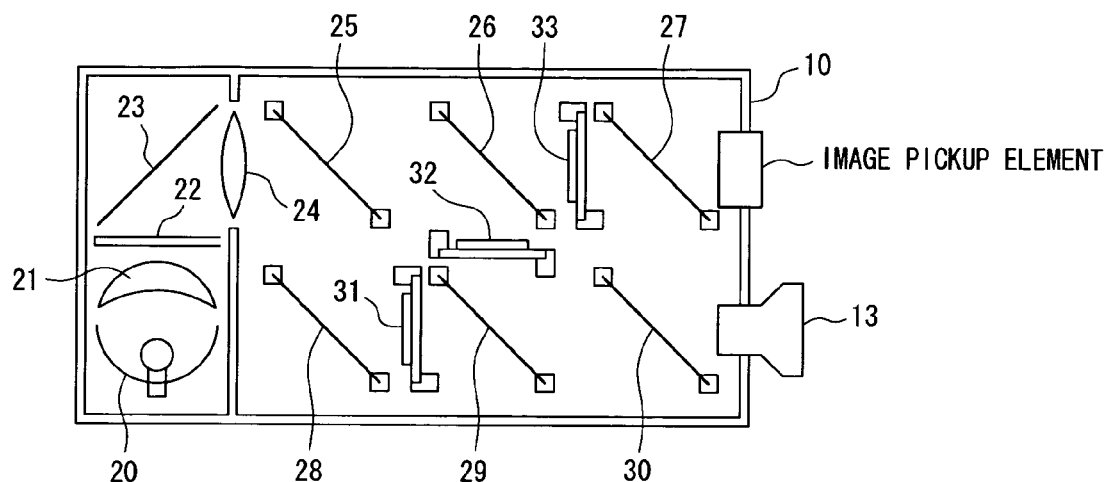
FIG. 3 is a plan view showing the internal structure of a projection section 120.
Figure 4:
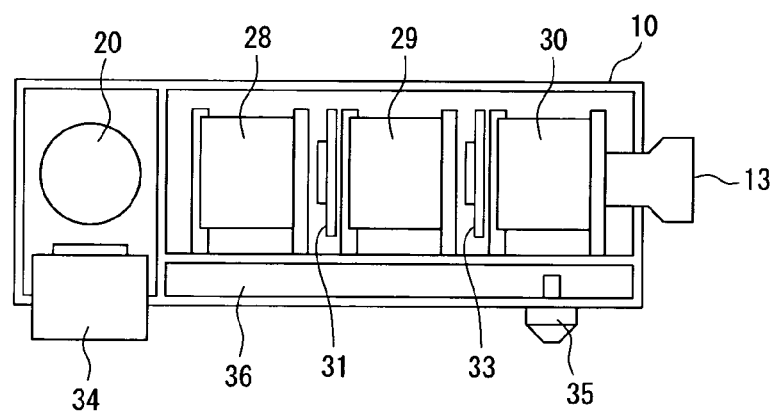
FIG. 4 is a side view showing the internal structure of the projection section 120.

Now, the internal structure of the projection section 120 will be described in detail with reference to FIGS. 3 and 4. FIG. 3 is a plan view showing the internal structure of the projection section 120. FIG. 4 is a side view showing the internal structure of the projection section 120.

In FIGS. 3 and 4, visible light from a light source 20 composed of a tungsten halogen lamp or a metal halide lamp and a reflector plate is condensed by an optical system composed of a lens 21, a hot wire cut filter 22, a reflector 23, and a lens 24. Thus, visible light is obtained as almost parallel beams. Heat generated by the light source 20 is forcibly discharged by a radiating fan 34.

Visible light emitted by an illuminating optical system is divided into three primary colors, red, green, and blue by a dichroic mirror. In examples, a blue reflection mirror 25 separates blue from the light so that the blue light illuminates a blue display panel 31 via a blue reflection mirror 28. A red reflection mirror 26 separates red from the light so that the red light illuminates a red display panel 32. The remaining green light illuminates a green display panel 33. An image displayed on the green display panel 33 reaches a projection lens 13 via green reflection mirrors 27 and 30. An image displayed on the red display panel 32 reaches the projection lens 13 via a red reflection mirror 29. An image displayed on the blue display panel 31 passes through the red reflection mirror 29 and green reflection mirror 30 to the projection lens 13.

The three display panels are arranged at the same optical distance from the projection lens 13. The dichroic mirror causes images on the display panels to be synthesized, enlarged, and projected through the projection lens 13.

Reference numeral 35 denotes a leg used to adjust a projection angle. Reference numeral 36 denotes a circuit section in which a control circuit and a power circuit are arranged.

In this case, the image pickup element 130 is preferably mounted close to the projection lens 13, notably immediately above it so as not to vary the shape of an actual projected image. This is because the shape of the actual projected image to be loaded into the image pickup element 130 varies depending on the angle at which the actual projected image projected by the projection section 120 is loaded.

On the other hand, referring back to FIG. 2, the image pickup element 130 is composed of a two-dimensional area sensor. The image pickup element 130 is adapted to obtain an area image from the actual projected image projected by the projection section 120 and output, to the error detection section 140, an image pickup signal that can construct the loaded actual projected image. Further, a timing signal inputted to the projection section 120 is inputted to the image pickup element 130. On the basis of the inputted timing signal, the image pickup element 130 synchronizes a projection timing for the projection section 120 with a loading timing for the image pickup element 130.

On receiving an error signal from the error detection section 140, the notification section 150 transmits, to the monitor center 200, information indicating that an error is occurring in the projection section 120, error information indicative of the contents of the inputted error signal, and an event log for the projection apparatus 100.

Figure 5:
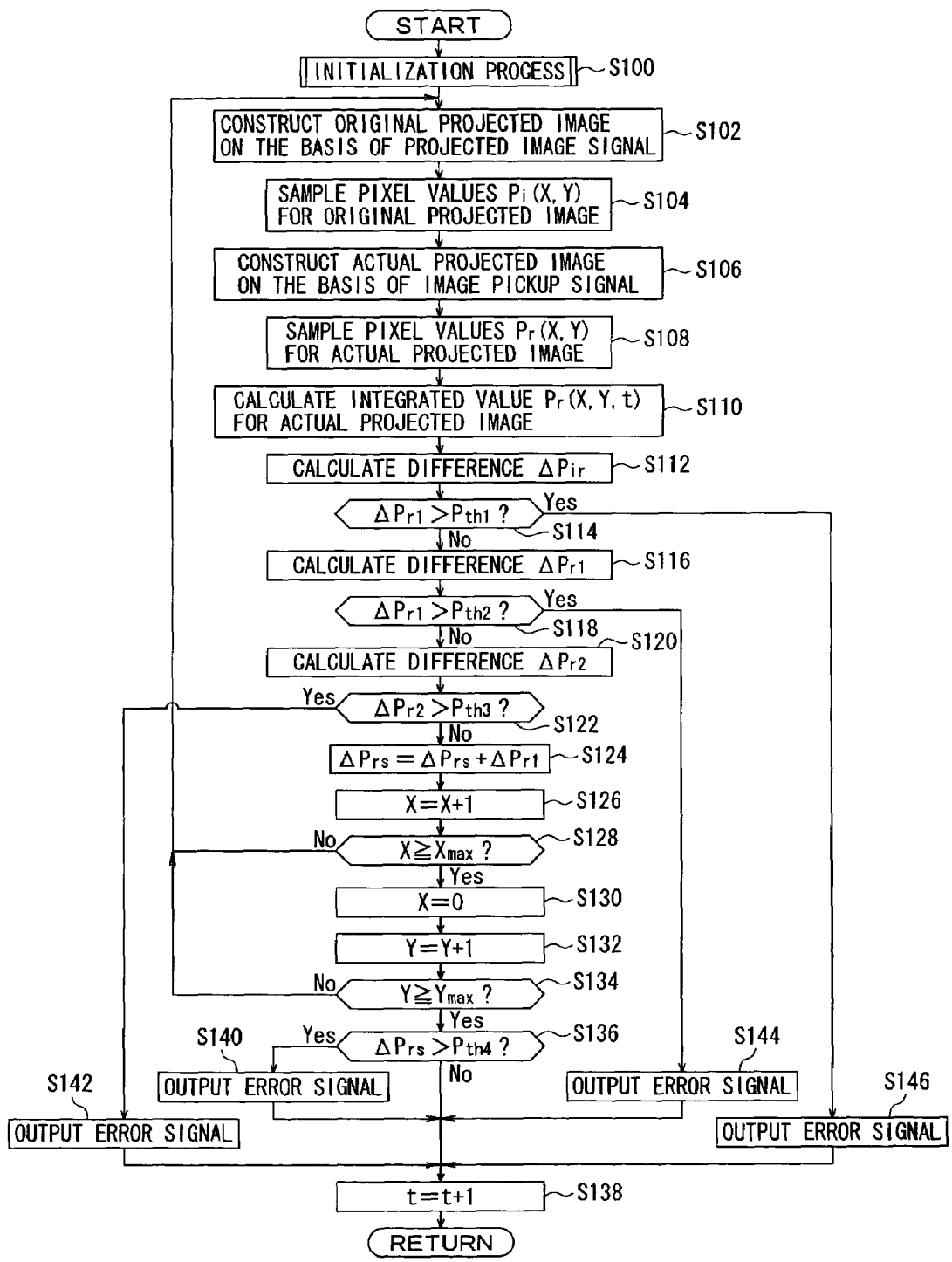
FIG. 5 is a flow chart showing an error detection process.

The error detection section 140 is composed of a CPU, a ROM, a RAM, an I/F, and the like all of which are connected together via a bus, and provides the same functions as those of a common computer. The error detection section 140 activates a predetermined program stored in a predetermined area in the ROM to execute the error detection process shown in the flow chart in FIG. 5, in accordance with this program. FIG. 5 is the flow chart showing the error detection process.

The error detection process detects errors in the projection section 120 on the basis of a projected image signal and an image pickup signal from the image pickup element 130. When executed in the CPU, this process first executes step S100 as shown in FIG. 5.

In step S100, an initialization process is executed. Specifically, the number $X_{max}$ of pixels in each of an original projected image and an actual projected image in a horizontal direction is set. The number $Y_{max}$ of pixels in each of the original projected image and actual projected image in a vertical direction is set. Then, thresholds $P_{th1}$, $P_{th2}$, $P_{th3}$, and $P_{th4}$ are set. Further, one-dimensional variables X, Y, t, $\Delta P_{ir}$, $\Delta P_{r1}$, $\Delta P_{r2}$, and $\Delta P_{rs}$ are provided and set to zero. Two-dimensional variables $P_i(X_{max}, Y_{max})$ and $P_r(X_{max}, Y_{max})$ in which pixel values are to be stored are provided and set to zero. A three-dimensional variable $P_r(X_{max}, Y_{max}, t_{max})$ in which the integrated value of pixel values is to be stored are provided and set to zero.

Then, the procedure shifts to step S102 to construct an original projected image on the basis of a projected image signal inputted by the projection section 120. The procedure shifts to step S104 to sample the pixel value for an inspected position in the constructed original projected image which position is indicated by the values of the variables X and Y. The sampled pixel value is stored in the variable $P_i(X, Y)$. This sampling is carried out at intervals of $\Delta t$ seconds at which the error detection process is executed.

Then, the procedure shifts to step S106 to construct an actual projected image on the basis of an image pickup signal inputted by the image pickup element 130. The procedure then shifts to step S108 to sample the pixel value for an inspected position in the constructed actual projected image which position is indicated by the values of the variables X and Y. The sampled pixel value is stored in the variable $P_r(X, Y)$. This sampling is carried out at intervals of $\Delta t$ seconds at which the error detection process is executed.

Then, the procedure shifts to step S110 to determine past pixel values for the inspected position in the actual projected image which position is indicated by the variables X and Y, every $\Delta t$ starting with the current time t, and to add N (an integer equal to or larger than 1) consecutive past pixel values together, on the basis of Equation (1). The calculated integrated value is stored in the variable $P_r(X, Y, t)$.

$$P_r(X, Y, t) = P_r(X, Y, t-1) + P_r(X, Y) \tag{1}$$

Then, the procedure shifts to step S112 to calculate the difference between the pixel value $P_i(X, Y)$ for the inspected position in the original projected image which position is indicated by the variables X and Y and the pixel value $P_r(X, Y)$ for the inspected position in the actual projected image which position is indicated by the variables X and Y, on the basis of Equation (2). The calculated difference is stored in the variable $\Delta P_{ir}$.

$$\Delta P_{ir} = |P_i(X, Y) - P_r(X, Y)| \quad (2)$$

Then, the procedure shifts to step S114 to determine whether or not the value of the variable $\Delta P_{ir}$ is larger than the threshold $P_{th1}$. If the value of the variable $\Delta P_{ir}$ is equal to or smaller than the threshold $P_{th1}$ (No), then the procedure shifts to step S116 to calculate the difference between the integrated value $P_r(X, Y, t)$ for the inspected position in the actual projected image which position is indicated by the variables X and Y and the integrated value $P_r(X-1, Y, t)$ for a position adjacent to the inspected position in the actual projected image which position is indicated by the variables X and Y, on the basis of Equation (3). The calculated difference is stored in the variable $\Delta P_{r1}$.

$$\Delta P_{r1} = |P_r(X, Y, t) - P_r(X-1, Y, t)| \quad (3)$$

Then, the procedure shifts to step S118 to determine whether or not the value of the variable $\Delta P_{r1}$ is larger than the threshold $P_{th2}$.

In this case, the variable $\Delta P_{r1}$ has been described by using $P_r(X-1, Y, t)$ as an example of the integrated value $P_r$ for the adjacent position. The integrated value $P_r$ can be determined for eight adjacent positions, i.e. it is possible to determine $P_r(X-1, Y, t)$, $P_r(X+1, Y, t)$ $P_r(X, Y-1, t)$, $P_r(X, Y+1, t)$, $P_r(X-1, Y-1, t)$, $P_r(X+1, Y-1, t)$, $P_r(X-1, Y+1, t)$, and $P_r(X+1, Y+1, t)$. Accordingly, the integrated value $P_r(X, Y, t)$ for the inspected position in the actual projected image which position is indicated by the variables X and Y is determined. Then, the integrated values $P_r$ for the eight positions adjacent to the inspected position in the actual projected image which position is indicated by the variables X and Y are determined. Subsequently, the difference between the value $P_r(X, Y, t)$ and each value $P_r$ is calculated and the calculated differences are stored in the variable $\Delta P_{r1}$. It is then determined whether or not each of the stored variables $\Delta P_{r1}$ is larger than the threshold $P_{th2}$. Alternatively, the variable $\Delta P_{r1}$ is calculated for the integrated value $P_r$ for a predetermined one of the eight adjacent positions. Then, the above determination is made.

If the value of the variable $\Delta P_{r1}$ is equal to or smaller than the threshold $P_{th2}$ (No), then the procedure shifts to step S120. On the basis of Equation (4), the integrated value $P_r(X, Y, t)$ for the inspected position in the actual projected image which position is indicated by the variables X and Y is determined. Then, the integrated value $P_r(X-k, Y, t)$ for a position separate from the inspected position in the actual projected image which position is indicated by the variables X and Y is determined is determined. Subsequently, the difference between the value $P_r(X, Y, t)$ and the value $P_r(X-k, Y, t)$ is calculated and the calculated differences are stored in the variable $\Delta P_{r2}$.

$$\Delta P_{r2} = |P_r(X, Y, t) - P_r(X-k, Y, t)| \quad (4)$$

Then, the procedure shifts to step S122 to determine whether or not the variable $\Delta P_{r2}$ is larger than the threshold $P_{th3}$. In this case, k denotes an integral value which is equal to or larger than 2 and which is equal to or smaller than one-hundredth of the larger of the number of horizontal pixels and the number of vertical pixels.

Further, in this case, the variable $\Delta P_{r2}$ has been described by using $P_r(X-k, Y, t)$ as an example of the integrated value $P_r$ for the separate position. The integrated value $P_r$ can be determined for eight separate positions, i.e. it is possible to determine $P_r(X-k, Y, t)$, $P_r(X+k, Y, t)$, $P_r(X, Y-k, t)$, $P_r(X, Y+k, t)$, $P_r(X-k, Y-k, t)$, $P_r(X+k, Y-k, t)$, $P_r(X-k, Y+k, t)$, and $P_r(X+k, Y+k, t)$. Accordingly, the integrated value $P_r(X, Y, t)$ for the inspected position in the actual projected image which position is indicated by the variables X and Y is determined. Then, the integrated values $P_r$ for the eight positions separate from the inspected position in the actual projected image which position is indicated by the variables X and Y are determined. Subsequently, the difference between the value $P_r(X, Y, t)$ and each value $P_r$ is calculated and the calculated differences are stored in the variable $\Delta P_{r2}$. It is then determined whether or not each of the stored variables $\Delta P_{r2}$ is larger than the threshold $P_{th3}$. Alternatively, the variable $\Delta P_{r2}$ is calculated for the integrated value $P_r$ for a predetermined one of the eight separate positions. Then, the above determination is made.

If the value of the variable $\Delta P_{r2}$ is equal to or smaller than the threshold $P_{th3}$ (No), then the procedure shifts to step S124. On the basis of Equation (5), the sum of the variables $\Delta P_{r1}$ is calculated. Then, the calculated sum is stored in the variable $\Delta P_{rs}$.

$$\Delta P_{rs} = \Delta P_{rs} + \Delta P_{r1} \quad (5)$$

Then, the procedure shifts to step S126 to set the value of the variable X plus "1" as a new value for the variable X. The procedure then shifts to step S128 to determine whether or not the value of the variable X is equal to or larger than the maximum number $X_{max}$ of horizontal pixels. If it is determined that the value of the variable X is equal to or larger than the maximum number $X_{max}$ of horizontal pixels (Yes), the procedure shifts to step S130.

In step S130, "0" is set for the variable X. The procedure then shifts to step S132 to set the value of the variable Y plus "1" as a new value for the variable Y. The procedure then shifts to step S134 to determine whether or not the value of the variable Y is equal to or larger than the maximum number $Y_{max}$ of vertical pixels. If it is determined that the value of the variable Y is equal to or larger than the maximum number $Y_{max}$ of vertical pixels (Yes), the procedure shifts to step S136.

In step S136, it is determined whether or not the value of the variable $\Delta P_{rs}$ is larger than the threshold $P_{th4}$. If the value of the variable $\Delta P_{rs}$ is equal to or smaller than the threshold $P_{th4}$ (No), the procedure shifts to step S138 to set the value of the variable t plus "1" as a new value for the variable t. Then, the series of operations is finished to return to the original process.

On the other hand, if in step S136, value of the variable $\Delta P_{rs}$ is larger than the threshold $P_{th4}$ (Yes), the procedure shifts to step S140 to output an error signal to the notification section 150, the signal indicating that the sum of the differences in integrated value between the adjacent pixels in the actual projected image is erroneous. The procedure then shifts to step S138.

Then, the integrated value $P_r(X, Y, t)$ for the inspected position in the actual projected image which position is indicated by the variables X and Y is determined. Then, the integrated values $P_r$ for the eight positions adjacent to the inspected position in the actual projected image which position is indicated by the variables X and Y are determined. Subsequently, the difference between the value $P_r(X, Y, t)$ and each value $P_r$ is calculated as the variable $\Delta P_{r1}$. The sum of the variable $\Delta P_{r1}$ is calculated. The calculated sums are stored in the variable $\Delta P_{rs}$. Then, steps S124 to S136 are executed on the stored variables $\Delta P_{rs}$. Alternatively, the variable $\Delta P_{rs}$ is calculated for the integrated value $P_r$ for a predetermined one of the eight adjacent positions. Then, the above determination is made.

On the other hand, if in step S134, it is determined that the value of the variable Y is smaller than the maximum number $Y_{max}$ of vertical pixels (No) or in step S128, the value of the variable X is smaller than the maximum number $X_{max}$ of horizontal pixels (No), the procedure shifts to step S102.

On the other hand, in step S122, if the value of the variable $\Delta P_{r2}$ is larger than the threshold $P_{th3}$ (Yes), the procedure shifts to step S142 to output an error signal to the notification section 150, the signal indicating that the difference in integrated value between the separate pixels in the actual projected image is erroneous. The procedure then shifts to step S138.

On the other hand, in step S118, if the value of the variable $\Delta P_{r1}$ is larger than the threshold $P_{th2}$ (Yes), the procedure shifts to step S144 to output an error signal to the notification section 150, the signal indicating that the difference in integrated value between the adjacent pixels in the actual projected image is erroneous. The procedure then shifts to step S138.

On the other hand, in step S114, if the value of the variable $\Delta P_{ir}$ is larger than the threshold $P_{th1}$ (Yes), the procedure shifts to step S146 to output an error signal to the notification section 150, the signal indicating that a comparison of the original projected image with the actual projected image indicates that there is a difference exceeding a predetermined range. The procedure then shifts to step S138.

Now, operations of the present embodiment will be described.

When a projected image signal is inputted to the projection apparatus 100, the projection section 120 projects an image on the screen 110 on the basis of the inputted projected image signal. This projection timing is based on a timing signal.

Further, the image pickup element 130 obtains an area image from the actual projected image produced by the projection section 120 and outputs, to the error detection section 140, an image pickup signal that can constitute the loaded actual projected image. This loading timing is based on the timing signal. In this case, the same timing signal is inputted to the projection section 120. Consequently, the projection timing for the projection section 120 is synchronized with the loading timing for the image pickup element 130.

Then, the projected image signal and the image pickup signal are inputted to the error detection section 140. Then, in steps S102 and S104, the error detection section 140 constructs the original projected image on the basis of the inputted projected image signal, and then samples the pixel value for an inspected position in the constructed original projected image which position is indicated by the variables X and Y. The sampled pixel value is stored in the variable $P_i$ (X, Y). Then, in steps S106 and S108, the error detection section 140 constructs the actual projected image on the basis of the inputted image pickup signal, and then samples the pixel value for an inspected position in the constructed actual projected image which position is indicated by the variables X and Y. The sampled pixel value is stored in the variable $P_r$(X, Y). Then, in step S110, on the basis of Equation (1), past pixel values for the inspected position in the actual projected image which position is indicated by the variables X and Y are determined every $\Delta t$ starting with the current time t, and N consecutive past pixel values are added together. The calculated integrated value is stored in the variable $P_r$ (X, Y, t).

In this manner, the pixel value $P_i$ (X, Y) and $P_r$ (X, Y) for the inspected position are sampled. When the integrated value $P_r$ (X, Y, t) for the inspected position is calculated, a first error detection process is executed in steps S112 and S114. In the first error detection process, first, on the basis of Equation (2), the pixel value $P_i$ (X, Y) for the inspected position in the original projected image which position is indicated by the variables X and Y is determined. Then, the pixel value $P_r$ (X, Y) for the inspected position in the actual projected image which position is indicated by the variables X and Y is determined. Then, the difference between the value $P_i$ (X, Y) and the value $P_r$ (X, Y) is calculated. The calculated difference is stored in the variable $\Delta P_{ir}$. If the variable $\Delta P_{ir}$ is larger than the threshold $P_{th1}$, it is determined that an error is occurring in the projection section 120. Then, in step S146, an error signal is outputted to the notification section 150, the signal indicating that a comparison of the original projected image with the actual projected image indicates that there is a difference exceeding a predetermined range. If any line defect is occurring in the actual projected image, the first error detection process enables this error to be detected.

When an error signal is inputted to the notification section 150, the notification section 150 transmits, to the monitor center 200, information indicating that an error is occurring in the projection section 120, error information indicative of the contents of the inputted error signal, and an event log for the projection apparatus 100.

Further, if no errors are detected in the projection apparatus 100 during the first error detection process, then in steps S116 and S118, a second error detection process is executed. During the second error detection process, first, on the basis of Equation (3), the integrated value $P_r$ (X, Y, t) for the inspected position in the actual projected image which position is indicated by the variables X and Y is determined. Then, the integrated value $P_r$ (X−1, Y, t) for a position adjacent to the inspected position in the actual projected image which position is indicated by the variables X and Y is determined. Then, the difference between the value $P_r$ (X, Y, t) and the value $P_r$ (X−1, Y, t) is calculated. The calculated difference is stored in the variable $\Delta P_{r1}$. If the variable $\Delta P_{r1}$ is larger than the threshold $P_{th2}$, it is determined that an error is occurring in the projection section 120. Then, in step S144, an error signal is outputted to the notification section 150, the signal indicating that the difference in integrated value between the adjacent pixels in the actual projected image is erroneous. If any line defect or nonuniform color is occurring in the actual projected image, the second error detection process enables this error to be detected. The processing executed in and after the steps related to the notification section 150 is similar to that described above.

Further, if no errors are detected in the projection apparatus 100 during the second error detection process, then in steps S120 and S122, a third error detection process is executed. During the third error detection process, first, on the basis of Equation (4), the integrated value $P_r$ (X, Y, t) for the inspected position in the actual projected image which position is indicated by the variables X and Y is determined. Then, the integrated value $P_r$ (X−k, Y, t) for a position separate from the inspected position in the actual projected image which position is indicated by the variables X and Y is determined. Then, the difference between the value $P_r$ (X, Y, t) and the value $P_r$ (X−k, Y, t) is calculated. The calculated difference is stored in the variable $\Delta P_{r2}$. If the variable $\Delta P_{r2}$ is larger than the threshold $P_{th3}$, it is determined that an error is occurring in the projection section 120. Then, in step S142, an error signal is outputted to the notification section 150, the signal indicating that the difference in integrated value between the separate pixels in the actual projected image is erroneous. If any line defect or nonuniform color is occurring in the actual projected image, the third error detection process enables this error to be detected. The processing executed in and after the steps related to the notification section 150 is similar to that described above.

Furthermore, if no errors are detected in the projection apparatus 100 during the third error detection process, then in step S124, on the basis of Equation (5), the sum of the variables $\Delta P_{r1}$ is calculated. The calculated sum is stored in the variable $\Delta P_{rs}$.

The first error detection process, the second error detection process, and the third error detection process are executed on all horizontal pixels in the uppermost stage of each of the original and actual projected images. If no errors are detected in these pixels, these processes are executed on all horizontal pixels in the second stage. This applies to the other pixels. Then, if the first error detection process, the second error detection process, and the third error detection process are executed on all pixels in the original and actual projected images and no errors are detected during these processes, then in step S136, a fourth error detection process is executed. During the fourth error detection process, if the value of the variable $\Delta P_{rs}$ is larger than the threshold $P_{th4}$, it is determined that an error is occurring in the projection section 120. Accordingly, in step S140, an error signal is outputted to the notification section 150, the signal indicating that the sum of the differences in integrated value between the adjacent pixels in the actual projected image is erroneous. If any nonuniform color is occurring in the actual projected image, the fourth error detection process enables this error to be detected. The processing executed in and after the steps related to the notification section 150 is similar to that described above.

Thus, the error detection process is completed on one screen for the original and actual projected images. Subsequently, the error detection process is executed at intervals of a predetermined period $\Delta t$ as described above.

Thus, in the present embodiment, the projection apparatus 100 comprises the projection section 120 that projects an image on the screen 110, the image pickup element 130 into which the actual projected image projected by the projection section 120 is loaded, the error detection section 140 that detects errors in the projection section 120 on the basis of the actual projected image loaded into the image pickup element 130, and the notification section 150 that carries out the predetermined notification when the error detection section 140 detects an error. The error detection section 140 is adapted to detect errors in the projection section 120 on the basis of the original projected image to be projected by the projection section 120 and the actual projected image loaded into the image pickup element 130.

Thus, errors in the projection section 120 can be detected on the basis of the original projected image and the actual projected image. Accordingly, compared to the prior art, errors in a display on the projection screen can be detected at a detailed level not only if the light source 20 cannot be lighted but also if, for example, any line defect is occurring in the actual projected image. Further, the predetermined notification allows the user to notice an error occurring in the projection section 120.

Furthermore, in the present embodiment, if the error detection section 140 detects an error, the notification section 150 carries out the predetermined notification to notify the monitor center 200 of this error.

Thus, the monitor center 200 can notice an error occurring in the projection apparatus 100, on the basis of the predetermined notification.

Furthermore, in the present embodiment, the image pickup element 130 is a two-dimensional area sensor.

Thus, an area image can be loaded from the actual projected image. Consequently, compared to the use of a one-dimensional line sensor, errors in the display on the projection screen can be detected relatively reliably.

Moreover, in the present embodiment, when an error signal from the error detection section 140 is inputted to the notification section 150, the notification section 150 transmits, to the monitor center 200, information indicating that an error is occurring in the projection section 120, error information indicative of the contents of the inputted error signal, and an event log for the projection apparatus 100.

Thus, the predetermined notification enables the user to notice an error occurring in the projection section 120 and obtain information on the error in the projection section 120 and the history of operations of the projection apparatus 100.

Furthermore, in the present embodiment, the error detection section 140 compares the original projected image with the actual projected image to detect an error in the projection section 120 on the basis of the difference between the original projected image and the actual projected image.

This enables the detection of errors in the display on the projection screen at a further detailed level.

Moreover, in the present embodiment, the error detection section 140 compares the original projected image with an actual projected image projected on the basis of the original projected image and then loaded into the image pickup element 130 at the same or at almost the same time as when the actual projected image is projected, to detect a difference between the original projected image and the actual projected image to detect an error in the projection section 120 on the basis of the detected difference.

Thus, errors in the display on the projection screen can be detected relatively accurately.

Furthermore, in the present embodiment, the error detection section 140 determines the integrated value $P_r$ (X, Y, t) for the inspected position in the actual projected image which position is indicated by the variables X and Y. Then, the error detection section 140 determines the integrated value $P_r$ (X–1, Y, t) for a position adjacent to the inspected position in the actual projected image which position is indicated by the variables X and Y. Then, the error detection section 140 calculates the difference $\Delta P_{r1}$ between the value $P_r$ (X, Y, t) and the value $P_r$ (X–1, Y, t). If the calculated difference $\Delta P_{r1}$ is larger than the threshold $P_{th2}$, the error detection section 140 determines that an error is occurring in the projection section 120.

Thus, errors in the projection section 120 are detected on the basis of the difference between the adjacent pixels. Consequently, errors in the display on the projection screen can be detected more accurately.

Moreover, in the present embodiment, the error detection section 140 calculates the sum of the variables $\Delta P_{r1}$ to determine that an error is occurring in the projection section 120 when the calculated sum exceeds the predetermined threshold $P_{th4}$.

Thus, errors in the projection section 120 are detected on the basis of the sum of the differences between the adjacent pixels, the differences being calculated for a plurality of inspected positions. Consequently, errors in the display on the projection screen can be detected more accurately.

Furthermore, in the present embodiment, the same timing signal is inputted to the projection section 120 and image pickup element 130. Thus, the projection timing for the projection section 120 is synchronized with the loading timing for the image pickup element 130 on the basis of the timing signal.

This enables the loading of the actual projected image corresponding to the original projected image. Consequently, errors in the display on the projection screen can be detected more accurately.

In the above embodiments, the projection section 120 corresponds to the projection section according to the second to fourth, eighth to tenth, fifteenth to seventeenth, nineteenth, twentieth, twenty-first, twenty-third, twenty-seventh to twenty-ninth, thirty-fourth to thirty-sixth, thirty-eighth, thirty-ninth, fortieth, forty-first, forty-third, forty-seventh to forty-ninth, fifty-fourth to fifty-sixth, fifty-eighth, fifty-ninth, sixtieth, sixty-first, sixty-third, sixty-seventh to sixty-ninth, seventy-fourth to seventy-sixth, or seventy-eighth aspect of the present invention. The image pickup element 130 corresponds to the image loading section corresponding to the second, fourth, seventh, tenth, nineteenth, twentieth, twenty-first, twenty-sixth, twenty-ninth, thirty-eighth, fortieth, forty-first, forty-sixth, forty-ninth, or fifty-eighth aspect of the present invention. The loading carried out by the image pickup element 130 corresponds to the image loading step according to the sixtieth, sixty-first, sixty-sixth, sixty-ninth, or seventy-eighth aspect of the present invention. Further, the error detection section 140 corresponds to the error detection section according to the second, fourth, ninth, tenth, fifteenth to seventeenth, twentieth, twenty-first, twenty-eighth, twenty-ninth, thirty-fourth to thirty-sixth, fortieth, forty-first, forty-eighth, forty-ninth, or fifty-fourth to fifty-sixth aspects of the present invention. The detection carried out by the error detection section 140 corresponds to the error detection step according to the sixtieth, sixty-first, sixty-eighth, sixty-ninth, or seventy-fourth to seventy-sixth aspects of the present invention. The notification section 150 corresponds to the error notification section according to the second, fourth, twentieth, twenty-first, fortieth, or forty-first aspect of the present invention.

Further, in the above embodiment, the notification carried out by the notification section 150 corresponds to the error notification step according to the sixtieth or sixty-first aspect of the present invention.

In the above embodiment, the image pickup element 130 is composed of a two-dimensional area sensor. However, the present invention is not limited to this aspect. The image pickup element 130 can be composed of a one-dimensional line sensor. Normally, line defects occur in both vertical and horizontal directions of the actual projected image. However, except for initial line defects, vertical line defects are more likely to occur. Thus, the one-dimensional line sensor is preferably provided so as to load a horizontal line image from the actual projected image.

Thus, the use of a one-dimensional line sensor enables relatively inexpensive arrangements. Further, compared to the provision of only a one-dimensional line sensor, vertical line defects, which are more likely to occur, can be detected. Consequently, errors in the display on the projection screen can be detected more accurately.

In this case, the image pickup element 130 corresponds to the image loading section according to the fifth, twenty-fourth, or forty-fourth aspect of the present invention. The loading carried out by the image pickup element 130 corresponds to the image loading step according to the sixty-fourth aspect of the present invention.

Further, in the above embodiment, the error detection section 140 compares the original projected image with an actual projected image projected on the basis of the original projected image and then loaded into the image pickup element 130 at the same or at almost the same time as when the actual projected image is projected, to detect a difference between the original projected image and the actual projected image to detect an error in the projection section 120 on the basis of the detected difference. However, the present invention is not limited to this aspect. The projected image signal may be compared with the image pickup signal to detect errors in the projection section 120 on the basis of the difference between the projected image signal and the image pickup signal. Specifically, the error detection section 140 compares a projected image signal inputted to the projection section 120 and which can construct the original projected images with an image pickup signal outputted by the image pickup element 130 and which can construct an actual projected image projected on the basis of the original projected image and then loaded into the image pickup element 130 at the same or almost the same time as when the actual projected image is projected, to detect a difference between the original projected image and the actual projected image to detect an error in the projection section 120 on the basis of the detected difference.

Consequently, errors in the display on the projection screen can be detected more accurately.

In this case, the projection section 120 corresponds to the projection section according to the eleventh, thirtieth, fiftieth, or seventieth aspect of the present invention. The image pickup element 130 corresponds to the image loading section according to the eleventh, thirtieth, or fiftieth aspect of the present invention. The loading carried out by the image pickup element 130 corresponds to the image loading step according to the seventieth aspect of the present invention. Further, the error detection section 140 corresponds to the error detection section according to the eleventh, thirtieth, or fiftieth aspect of the present invention. The detection carried out by the error detection section 140 corresponds to the error detection step according to the seventieth aspect of the present invention. The image pickup signal corresponds to the loaded image signal according to the eleventh, thirtieth, fiftieth, or seventieth aspect of the present invention.

Further, in the present embodiment, the projection apparatus 100 uses the image pickup element 130 to load an actual projected image obtained by synthesizing images in three colors so as to detect errors in the projection section 120 on the basis of the loaded actual projected image. However, the present invention is not limited to this aspect. For more accurate detections, actual projected images in three colors may be loaded into the image pickup element 130 so as to detect errors in the projection section 120 on the basis of the loaded actual projected images in the respective colors. Specifically, the arrangements described below are possible.

First, the image pickup element 130 is monochrome sensors provided in association with the actual projected images in the different colors so that the actual projected images in the different colors can be loaded into the respective monochrome sensors. The error detection section 140 compares the original projected image with an actual projected image projected on the basis of the original projected image and then loaded into a corresponding one of the monochrome sensors at the same or at almost the same time as when the actual projected image is projected, to detect a difference between the original projected image and the actual projected image to detect an error in the projection section 120 on the basis of the detected difference.

Thus, errors in the projection section 120 are detected for each projected image in the corresponding color. Consequently, errors in the display on the projection screen can be detected more accurately.

In this case, the projection section 120 corresponds to the projection section according to the twelfth, thirty-first, fifty-first, or seventy-first aspect of the present invention. The image pickup element 130 corresponds to the image loading section according to the twelfth, thirty-first, or fifty-first aspect of the present invention. The loading carried out by the image pickup element 130 corresponds to the image loading step according to the seventy-first aspect of the present invention. Further, the error detection section 140 corresponds to the error detection section according to the twelfth, thirty-first, or fifty-first aspect of the present invention. The detection carried out by the error detection section 140 corresponds to the error detection step according to the seventy-first aspect of the present invention.

Second, the image pickup element 130 is monochrome sensors provided in association with the actual projected images in the different colors so that the actual projected images in the different colors can be loaded into the respective monochrome sensors. The error detection section 140 compares, for corresponding projected images in each color, a projected image signal inputted to the projection section 120 and which can construct the original projected images with an image pickup signal outputted by a corresponding one of the monochrome sensors and which can construct an actual projected image projected on the basis of the original projected image and then loaded into the monochrome sensor at the same or almost the same time as when the actual projected image is projected, to detect a difference between the original projected image and the actual projected image to detect an error in the projection section 120 on the basis of the detected difference.

Thus, errors in the projection section 120 are detected for each projected image in the corresponding color. Consequently, errors in the display on the projection screen can be detected more accurately.

In this case, the projection section 120 corresponds to the projection section according to the thirteenth, thirty-second, fifty-second, or seventy-second aspect of the present invention. The image pickup element 130 corresponds to the image loading section according to the thirteenth, thirty-second, or fifty-second aspect of the present invention. The loading carried out by the image pickup element 130 corresponds to the image loading step according to the seventy-second aspect of the present invention. Further, the error detection section 140 corresponds to the error detection section according to the thirteenth, thirty-second, or fifty-second aspect of the present invention. The detection carried out by the error detection section 140 corresponds to the error detection step according to the seventy-second aspect of the present invention. The image pickup signal corresponds to the loaded image signal according to the thirteenth, thirty-second, fifty-second, or seventy-second aspect of the present invention.

Third, in the first and second arrangements, the error detection section 140 determines that an error is occurring in the light source 20 when the difference between the corresponding projected images in a certain color exceeds a predetermined range.

Thus, simply by comparing the original projected image with the actual projected image, it can be detected that an error is occurring in the light source 20.

In this case, the projection section 120 corresponds to the projection section according to the fourteenth, thirty-third, fifty-third, or seventy-third aspect of the present invention. The error detection section 140 corresponds to the error detection section according to the fourteenth, thirty-third, or fifty-third aspect of the present invention. The loading carried out by the image pickup element 130 corresponds to the image loading step according to the seventy-third aspect of the present invention. Further, the display panels 31 to 33 correspond to the image display section according to the fourteenth, thirty-third, fifty-third, or seventy-third aspect of the present invention.

Further, in the present embodiment, when an error signal from the error detection section 140 is inputted to the notification section 150, the notification section 150 transmits, to the monitor center 200, information indicating that an error is occurring in the projection section 120, error information indicative of the contents of the inputted error signal, and an event log for the projection apparatus 100. However, the present invention is not limited to this aspect. These pieces of information may be provided in response to an access from the monitor center 200. The notification section 150 saves an error detection result obtained by the error detection section 140 and provides the saved error detection result to the monitor center 200 when the monitor center 200 accesses the projection apparatus.

This arrangement also produces effects similar to those of the above embodiments.

In this case, the projection section 120 corresponds to the projection section according to the twenty-second, forty-second, or sixty-second aspect of the present invention. The image pickup element 130 corresponds to the image loading section according to the twenty-second or forty-second aspect of the present invention. The loading carried out by the image pickup element 130 corresponds to the image loading step according to the sixty-second aspect of the present invention. Further, the error detection section 140 corresponds to the error detection section according to the twenty-second or forty-second aspect of the present invention. The detection carried out by the error detection section 140 corresponds to the error detection step according to the sixty-second aspect of the present invention. The notification section 150 corresponds to the detection result providing section according to the twenty-second or forty-second aspect of the present invention. The notification carried out by the notification section 150 corresponds to the detection result providing step according to the sixty-second aspect of the present invention.

Further, in the above embodiments, the error detection section 140 compares the original projected image with the actual projected image to detect errors in the projection section 120 on the basis of the difference between the original projected image and the actual projected image. However, the present invention is not limited to this aspect. The error detection section 140 may compare the original projected image with the actual projected image to detect errors in the projection section 120 on the basis of a match between the original projected image and the actual projected image.

Further, in the above embodiments, the original projected image is composed of a projected image signal. However, the present invention is not limited to this aspect. The original projected image may be composed of projected image information. In this case, the projected image information may be obtained from a PC or the like and prepared.

Further, in the above embodiments, the error detection process shown in the flow chart in FIG. 5 is executed. However, the present invention is not limited to this aspect. The error detection process shown in the flow chart in FIG.

Figure 6:
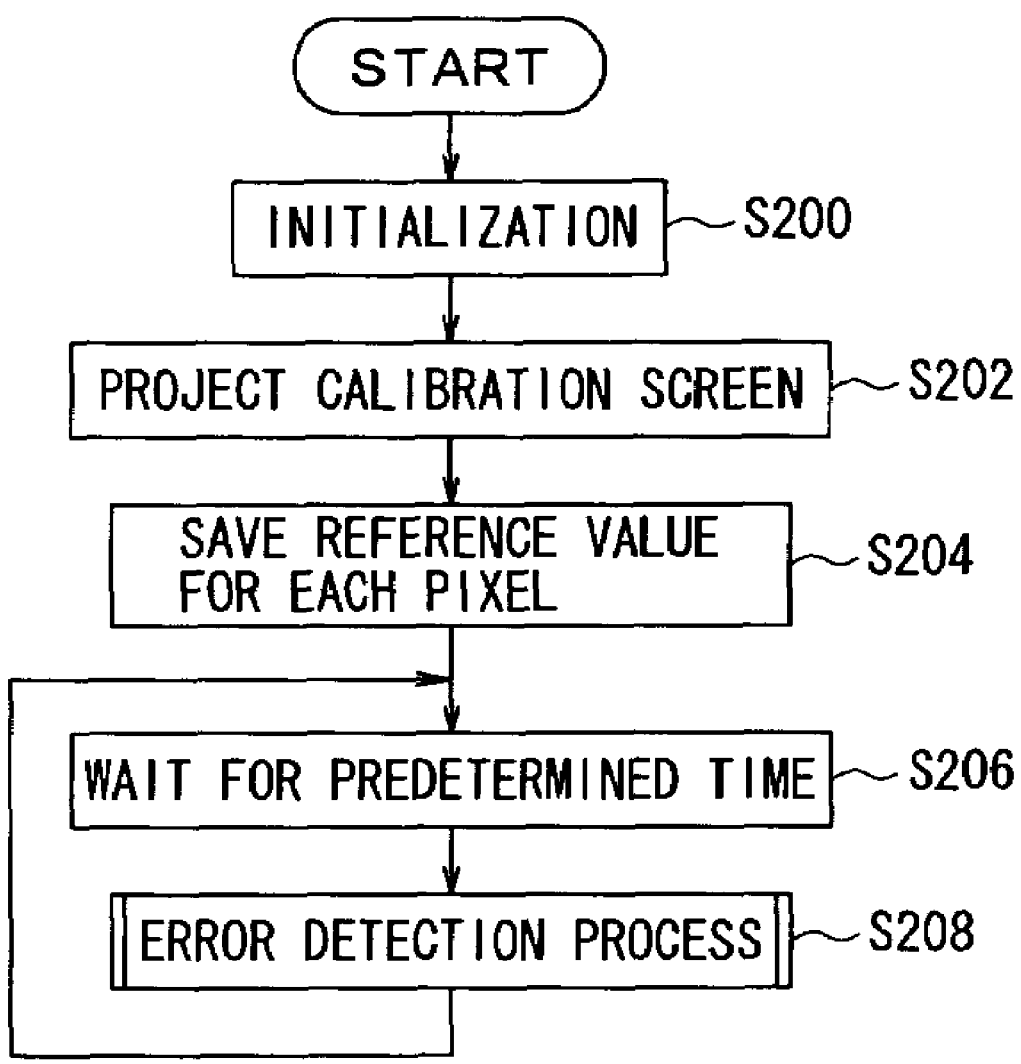
FIG. 6 is a flow chart showing an error detection process in which inspections are carried out by projecting a calibration screen.

6 may be executed. FIG. 6 is the flow chart showing the error detection process in which inspections are carried out by projecting a calibration screen.

When this error detection process is executed in the CPU 30, the process first shifts to step S200 as shown in FIG. 6.

In step S200, initialization is carried out. The procedure then shifts to step S202 to cause the projection section 120 to project the calibration screen. The procedure then shifts to step S204 to sample the value for each pixel in the actual projected image. The sampled pixel values are saved as reference values. The procedure then shifts to step S206.

In step S206, the procedure waits for a predetermined time and then shifts to step S208. Then, a process similar to the error detection process shown in the flow chart in FIG. 5 is executed. The procedure then shifts to step S206.

Figure 7:
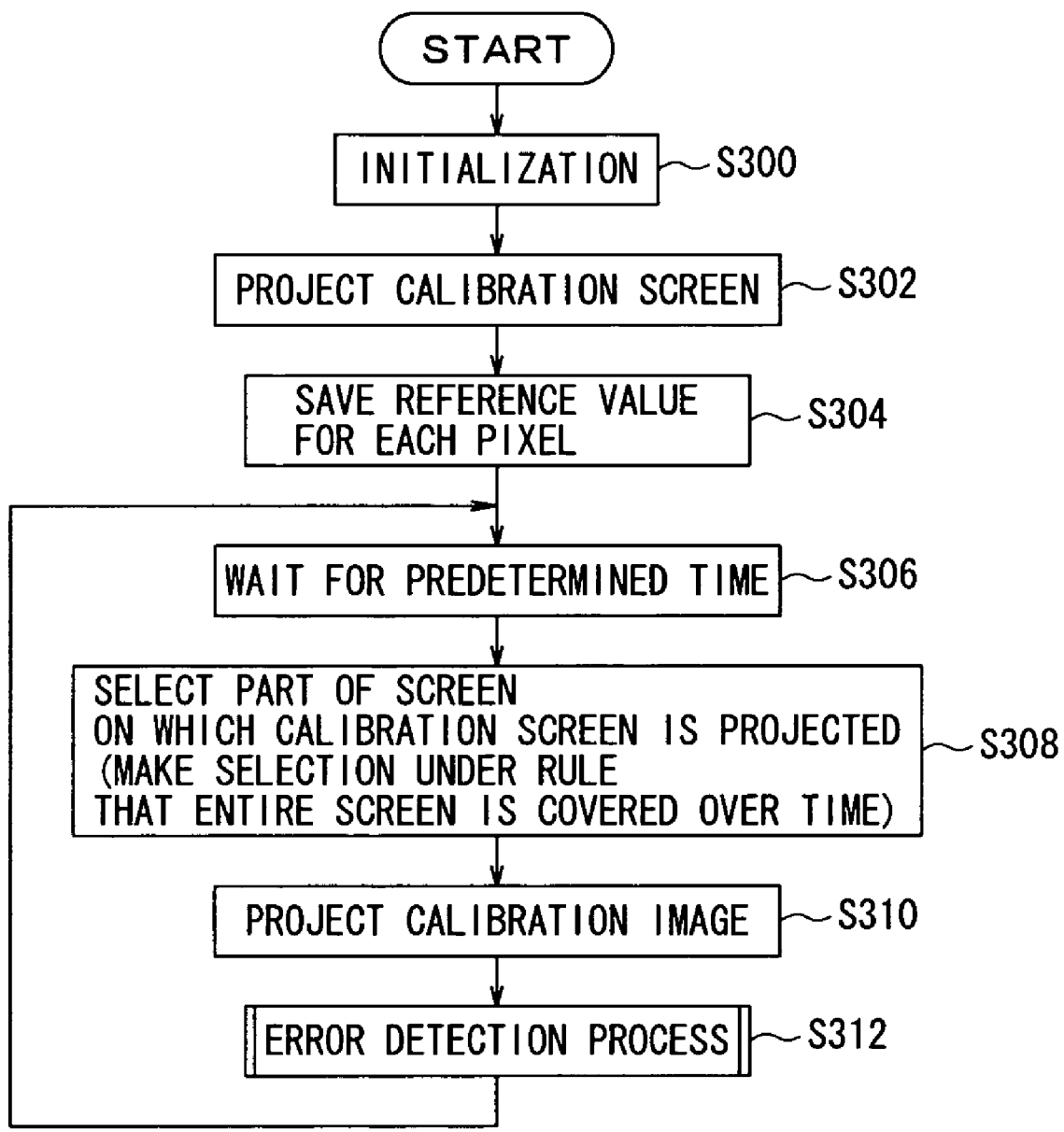
FIG. 7 is a flow chart showing an error detection process in which inspections are carried out by projecting the calibration screen as a part of an actual projected image.

Further, in the above embodiments, the error detection process shown in the flow chart in FIG. 5 is executed. However, the present invention is not limited to this aspect. The error detection process shown in the flow chart in FIG. 7 may be executed. FIG. 7 is the flowchart showing the error detection process in which inspections are carried out by projecting the calibration screen as a part of the actual projected image.

When this error detection process is executed in the CPU 30, the process first shifts to step S300 as shown in FIG. 7.

In step S300, initialization is carried out. The procedure then shifts to step S302 to cause the projection section 120 to project the calibration screen. The procedure then shifts to step S304 to sample the value for each pixel in the actual projected image. The sampled pixel values are saved as reference values. The procedure then shifts to step S306.

In step S306, the procedure waits for a predetermined time and then shifts to step S308. Then, a part of the screen is selected so that the calibration screen is projected on this part. The procedure then shifts to step S310 to cause the projection section 120 to project the calibration screen on the selected part of the screen. The procedure then shifts to step S312, where a process similar to the error detection process shown in the flow chart in FIG. 5 is executed. The procedure then shifts to step S306.

Figure 8:
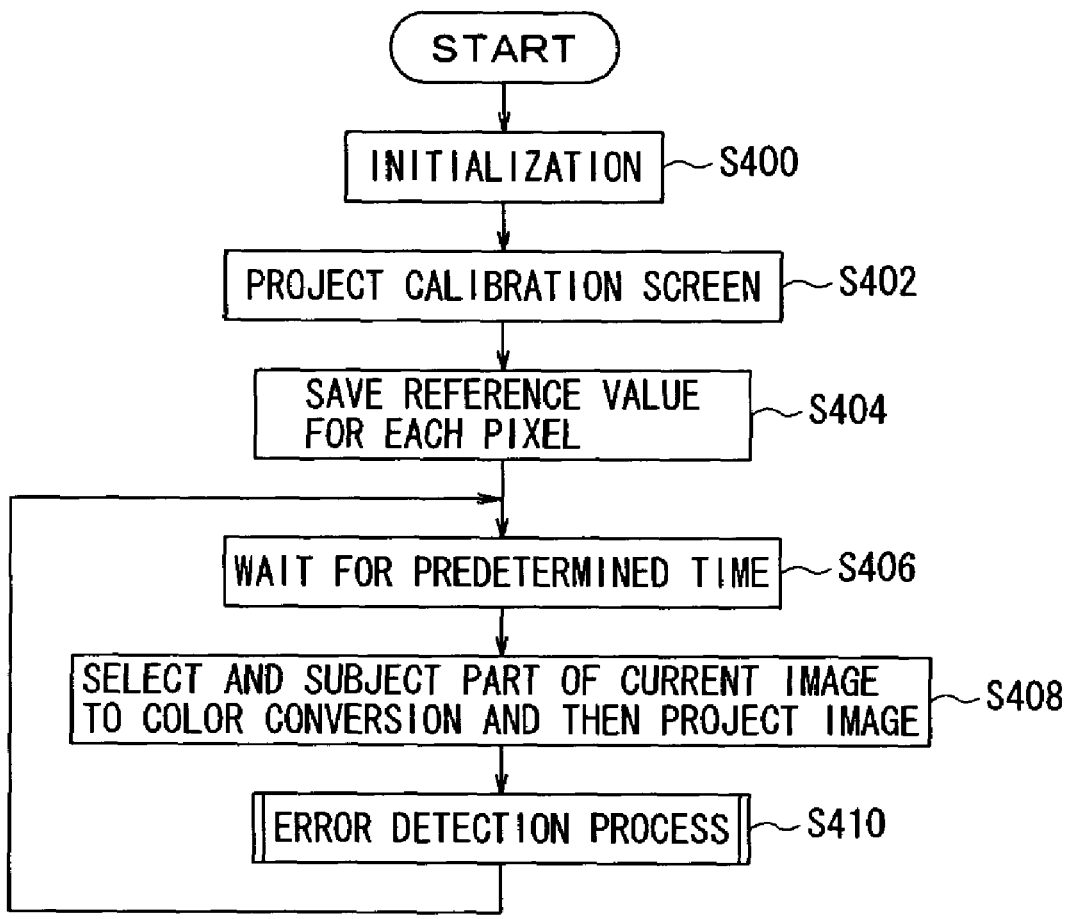
FIG. 8 is a flow chart showing an error detection process in which inspections are carried out by subjecting a part of the actual projected image to a color conversion.

Further, in the above embodiments, the error detection process shown in the flowchart in FIG. 5 is executed. However, the present invention is not limited to this aspect. The error detection process shown in the flow chart in FIG. 8 may be executed. FIG. 8 is the flowchart showing the error detection process in which inspections are carried out by subjecting a part of the actual projected image to a color conversion.

When this error detection process is executed in the CPU 30, the process first shifts to step S400 as shown in FIG. 8.

In step S400, initialization is carried out. The procedure then shifts to step S402 to cause the projection section 120 to project the calibration screen. The procedure then shifts to step S404 to sample the value for each pixel in the actual projected image. The sampled pixel values are saved as reference values. The procedure then shifts to step S406.

In step S406, the procedure waits for a predetermined time and then shifts to step S408. Then, a part of the current actual projected image is selected and subjected to a color conversion. The image is then reprojected. The procedure then shifts to step S410, where a process similar to the error detection process shown in the flow chart in FIG. 5 is executed. The procedure then shifts to step S406.

Further, in the present embodiment, the error detection section 140 determines the integrated value $P_r(X, Y, t)$ for the inspected position in the actual projected image which position is indicated by the variables X and Y. Then, the error detection section 140 determines the integrated value $P_r(X-1, Y, t)$ for a position adjacent to the inspected position in the actual projected image which position is indicated by the variables X and Y. Then, the error detection section 140 calculates the difference $\Delta P_{r1}$ between the value $P_r(X, Y, t)$ and the value $P_r(X-1, Y, t)$. If the calculated difference $\Delta P_{r1}$ is larger than the threshold $P_{th2}$, the error detection section 140 determines that an error is occurring in the projection section 120. However, the present invention is not limited to this aspect. The arrangements described below are possible.

First, the error detection section 140 determines the integrated value $P_r(X, Y, t)$ for the inspected position in the actual projected image which position is indicated by the variables X and Y. Then, the error detection section 140 determines an integrated value $P_r(X, Y, t-k)$ for the inspected position in the actual projected image which position is indicated by the variables X and Y, the value Pr (X, Y, t-k) having been measured a predetermined time earlier. Then, the error detection section 140 calculates the difference between the value $P_r(X, Y, t)$ and the value $P_r(X, Y, t-k)$. If the calculated difference is larger than a predetermined threshold, the error detection section 140 determines that an error is occurring in the projection section 120.

Second, the error detection section 140 compares a value for an arbitrary pixel measured when a reference color is displayed at the pixel with a value for the arbitrary pixel measured when the reference color was previously displayed at the pixel. The error detection section 140 thus detects the difference between these pixel values to determine that an error is occurring in the projection section 120, on the basis of the detected difference.

Third, the error detection section 140 compares a value for an arbitrary pixel measured when a certain color is displayed at the pixel with a reference value for the same pixel (or a group of pixels). The error detection section 140 thus detects the difference between these pixel values to determine that an error is occurring in the projection section 120, on the basis of the detected difference. In this case, the reference value is obtained from a network or the like.

Further, in the above embodiments, only one image pickup element 130 is provided. The present invention is not limited to this aspect. A plurality of image pickup elements 130 may be provided so that errors in the projection section 120 can be detected on the basis of actual projected images loaded from the respective image pickup elements 130.

Thus, errors in the display on the projection screen can be detected more accurately.

Further, in the above embodiments, if an error is detected during the first error detection process, the second error detection process, the third error detection process, or the fourth error detection process, an error signal is outputted to the notification section 150. However, the present invention is not limited to this aspect. When an error is detected, the detected pixel may be inspected again so that an error signal is not outputted to the notification section 150 until the error is detected again during this inspection.

Thus, errors in the display on the projection screen can be detected more accurately.

Further, in the above embodiments, the image pickup element 130 is provided so that an actual projected image projected on the screen 110 is loaded into the image pickup element 130. However, the present invention is not limited to this aspect. The image pickup element 130 made of a transparent element may be embedded in the projection lens 13.

Thus, errors in the projection section 120 can be detected even if there is any obstacle between the projection apparatus 100 and the screen 110.

Further, in the above embodiments, the projection apparatus 100 has an internal structure such that light beams from the light source 20 are condensed into the projection lens 13. However, the present invention is not limited to this aspect. A branching path may be provided and the image pickup element 130 may be provided at the end of the branching path so as to detect errors in the projection section 120.

Thus, errors in the projection section 120 can be detected even if there is any obstacle between the projection apparatus 100 and the screen 110.

Further, in the above embodiments, the error detection section 140 is configured to detect errors in the projection section 120 for predetermined inspection items. However, the present invention is not limited to this aspect. The error detection section 140 receives inspection items from the monitor center 200 to detect errors in the projection section 120 for the received inspection items.

This enables the monitor center 200 to adjust the contents of error detection services.

Further, in the above embodiments, to execute the process shown in the flow chart in FIG. 5, the control program already stored in the ROM is executed. However, the present invention is not limited to this aspect. A program indicating these procedures may be stored in a storage medium from which the program may be loaded into the RAM for execution. This also applies to the execution of the processes shown in the flow charts in FIGS. 6 to 8.

Here, the storage medium refers to a semiconductor storage medium such as a RAM or a ROM, a magnetic storage type storage medium such as an FD or an HD, an optical reading type storage medium such as a CD, a CDV, an LD, or a DVD, or a magnetic storage/optical reading type storage medium such as an MO. Any storage medium may be used regardless of the reading method, i.e. whether it is based on an electronic, magnetic, or optical reading method, provided that it can be read by a computer.

Further, in the above embodiments, the monitor system for a projection apparatus, the projection apparatus, the monitor program for a projection apparatus, and the monitor method for a projection apparatus according to the present invention are applied to a network system composed of the Internet 199. However, the present invention is not limited to this aspect. They may be applied to, for example, what is called "Intranet", which communicates on the basis of the same method as that for the Internet 199. Of course, they are not limited to the network communicating on the basis of the same method as that for the Internet 199 but may be applied to ordinary networks.

Further, in the above embodiments, the monitor system for a projection apparatus, the projection apparatus, the monitor program for a projection apparatus, and the monitor method for a projection apparatus according to the present invention are applied to the case in which an error in the projection apparatus 100 is detected and in which the monitor center 200 is then notified of this error as shown in FIG. 1. However, the present invention is not limited to this aspect. They may be applied to other cases without departing from the spirits of the present invention. For example, they may be applied to the case in which the projection apparatus 100 itself detects an error in itself and carries out a notification without being connected to the monitor center 200.

Furthermore, in the above embodiments, a projector is used as an example of the projection apparatus 100. However, a rear projector may be used in which projection section is installed behind a screen and in which projection light from the projection section is reflected by a reflector to display a projected image via the translucent screen.

What is claimed is:

1. A monitor system that monitors a projection apparatus having projection section for projecting an image, the system comprising image loading section for loading an actual projected image projected by said projection section, error detection section for detecting errors in said projection section on the basis of the actual projected image loaded into said image loading section, and error notification section for carrying out a predetermined notification when said error detection section detects an error, and
    wherein said error detection section detects errors in said projection section on the basis of an original projected image to be projected by said projection section and the actual projected image loaded into said image loading section and said image loading section is a one-dimensional line sensor.

2. The monitor system for a projection apparatus according to claim 1, wherein a monitor center that monitors said projection apparatus and said projection apparatus are connected together so as to communicate with each other,
    in addition to said projection section, said projection apparatus has said image loading section, said error detection section, and, said error notification section, and
    when said error detection section detects an error, said error notification section carries out predetermined notification to notify said monitor center of the error.

3. The monitor system for a projection apparatus according to claim 1, wherein said one-dimensional line sensor is adapted to obtain a horizontal line image from said actual projected image.

4. The monitor system for a projection apparatus according to claim 1, wherein said image loading section is a two-dimensional area sensor.

5. The monitor system for a projection apparatus according to claim 1, wherein said predetermined notification includes error information on an error in said projection section and an event log for said projection apparatus.

6. The monitor system for a projection apparatus according to claim 1, wherein said error detection section detects, and said error notification section carries out predetermined notification to notify said monitor center of the error.

7. The monitor system for a projection apparatus according to claim 1, wherein said original projected image comprises original projected images in a plurality of different colors,
    said actual projected image is obtained by synthesizing actual projected images in said plurality of colors projected on the basis of said original projected images in said plurality of colors,
    said image loading section is monochrome sensors provided in association with said actual projected images in said plurality of colors so that said actual projected images in said plurality of colors can be loaded into the respective monochrome sensors, and
    said error detection section compares, for corresponding projected images in each color, said original projected image with an actual projected image projected on the basis of the original projected image and then loaded into a corresponding one of said monochrome sensors at the same or at almost the same time as when the actual projected image is projected, to detect a difference between the original projected image and the actual projected image to detect an error in said projection section on the basis of the detected difference.

8. The monitor system for a projection apparatus according to claim 1, wherein said error detection section calculates a difference between a pixel value for a predetermined position in said actual projected image and a pixel value for a position adjacent to said predetermined position in said actual projected image, to determine that an error is occurring in said projection section when the calculated difference exceeds a predetermined threshold.

9. The monitor system for a projection apparatus according to claim 1, wherein said error detection section calculates a difference between a pixel value for a predetermined position in said actual projected image and a pixel value for a position separate from said predetermined position in said actual projected image, to determine that an error is occurring in said projection section when the calculated difference exceeds a predetermined threshold.

10. The monitor system for a projection apparatus according to claim 1, wherein for each of a plurality of detected positions in said actual projected image, said error detection section calculates a difference between a pixel value for the detected position in said actual projected image and a pixel value for a position adjacent to said detected position in said actual projected image, to determine that an error is occurring in said projection section when the sum of calculated differences exceeds a predetermined threshold.

11. The monitor system for a projection apparatus according to claim 1, wherein the same timing signal is inputted to said projection section and said image loading section, and a projection timing for said projection section is synchronized with a loading timing for said image loading section on the basis of said timing signal.

12. The monitor system for a projection apparatus according to claim 6, wherein said original projected image comprises original projected images in a plurality of different colors,
said actual projected image is obtained by synthesizing actual projected images in said plurality of colors projected on the basis of said original projected images in said plurality of colors,
said image loading section is monochrome sensors provided in association with said actual projected images in said plurality of colors so that said actual projected images in said plurality of colors can be loaded into the respective monochrome sensors, and
said error detection section compares, for corresponding projected images in each color, a projected image signal inputted to said projection section and which can construct said original projected images with a loaded image signal outputted by a corresponding one of said monochrome sensors and which can construct an actual projected image projected on the basis of the original projected image and then loaded into said monochrome sensor at the same or almost the same time as when the actual projected image is projected, to detect a difference between the original projected image and the actual projected image to detect an error in said projection section on the basis of the detected difference.

13. The monitor system for a projection apparatus according to claim 7, wherein said projection section includes image display section for displaying an image on the basis of the projected image signal or projected image information and a light source that irradiates the image displayed by said image display section with light to project the image on a screen, and said error detection section determines that an error is occurring in said light source when a predetermined threshold is exceeded for said corresponding projected images in one of the plurality of colors.

14. The monitor system for a projection apparatus according to claim 8, wherein said pixel value is obtained by sampling the value for the pixel at the same position N (N is an integer equal to or larger than 1) times from a reference time t at predetermined intervals At and adding the sampled pixel values together.

15. The monitor system for a projection apparatus according to claim 9, wherein said pixel value is obtained by sampling the value for the pixel at the same position N (N is an integer equal to or larger than 1) times from a reference time t at predetermined intervals At and adding the sampled pixel values together.

16. The monitor system for a projection apparatus according to claim 10, wherein said pixel value is obtained by sampling the value for the pixel at the same position N (N is an integer equal to or larger than 1) times from a reference time t at predetermined intervals At and adding the sampled pixel values together.

17. A projection apparatus comprising projection section for projecting an image, image loading section for loading the actual projected image projected by said projection section, error detection section for detecting errors in said projection section on the basis of the actual projected image loaded into said image loading section, and error notification section for carrying out a predetermined notification when said error detection section detects an error, and
wherein said error detection section detects errors in said projection section on the basis of an original projected image to be projected by said projection section and the actual projected image loaded into said image loading section, and said image loading section is a one-dimensional line sensor.

18. The projection apparatus according to claim 17, which is connected to a monitor center so as to communicate with the monitor center, and
wherein when said error detection section detects an error, said error notification section carries out a predetermined notification to notify said monitor center that the error is detected.

19. The projection apparatus according to claim 17, wherein said one-dimensional line sensor is adapted to load a horizontal line image from said actual projected image.

20. The projection apparatus according to claim 17, wherein said image loading section is a two-dimensional area sensor.

21. The projection apparatus according to claim 17, wherein said error detection section compares said original projected image with said actual projected image to detect an error in said projection section on the basis of a match or difference between the original projected image and the actual projected image.

22. A projection apparatus connected to a monitor center so as to communicate with the monitor center, the apparatus comprising projection section for projecting an image, image loading section for loading the actual projected image projected by said projection section, error detection section for detecting errors in said projection section on the basis of the actual projected image loaded into said image loading section, and detection result providing section for providing an error detection result obtained by said error detection section in response to an access from said monitor center, and wherein said error detection section detects errors in said projection section on the basis of an original projected image to be projected by said projection section and an actual projected image loaded into said image loading section, said image loading section is a one-dimensional line sensor, and said detection result providing section saves the error detection result obtained by said error detection section and provides said saved error detection result to said monitor center when said monitor center accesses said projection apparatus.

23. A monitor program for a projection apparatus, the program being executed by a projection apparatus having projection section for projecting an image and comprising a computer, the program comprising:

allowing execution of a process implemented as image loading section including a one-dimensional line sensor for loading the actual projected image projected by said projection section for detecting errors in said projection section on the basis of the actual projected image loaded into said image loading section, with error detection section, and carrying out a predetermined notification when said error detection section detects an error with error notification section, and wherein said error detection section detects errors in said projection section on the basis of an original projected image to be projected by said projection section and the actual projected image loaded into said image loading section.

24. A monitor program for a projection apparatus, the program being executed by a projection apparatus connected to a monitor center so as to communicate with the monitor center, having projection section for projecting an image, and comprising a computer, the program comprising:

allowing execution of a process implemented as image loading section including a one-dimensional line sensor for loading the actual projected image projected by said projection section, detecting errors in said projection section on the basis of the actual projected image loaded into said image loading section, with error detection section, and providing an error detection result obtained by said error detection section in response to an access from said monitor center with detection result providing section, and wherein said error detection section detects errors in said projection section on the basis of an original projected image to be projected by said projection section and an actual projected image loaded into said image loading section, and said detection result providing section saves the error detection result obtained by said error detection section and provides said saved error detection result to said monitor center when said monitor center accesses said projection apparatus.

25. A monitor method for a projection apparatus, the method monitoring a projection apparatus having a projection section for projecting an image, the method comprising:

loading the actual projected image projected by said projection section, with a one-dimensional line sensor, detecting an error in said projection section on the basis of the loaded actual projected image, and carrying out a predetermined notification when an error is detected, wherein said error detection detects an error in said projection section on the basis of an original projected image to be projected by said projection section and the actual projected image that was loaded.

26. A monitor method for a projection apparatus, the method monitoring a projection apparatus connected to a monitor center so as to communicate with the monitor center and having a projection section for projecting an image, the method comprising:

loading the actual projected image projected by said projection section, with a one-dimensional line sensor, detecting an error in said projection section on the basis of the actual projected image that was loaded, and a providing an error detection result obtained by said error detection step in response to an access from said monitor center, and wherein said error detection detects an error in said projection section on the basis of an original projected image to be projected by said projection section and an actual projected image that was loaded, and the error detection result obtained by said error detection is saved and provided to said monitor center when said monitor center accesses said projection apparatus.

* * * * *